US012659512B2

(12) United States Patent
Liu et al.

(10) Patent No.: US 12,659,512 B2
(45) Date of Patent: Jun. 16, 2026

(54) SYSTEM AND METHOD FOR END-TO-END LOSSLESS STEREO IMAGE COMPRESSION

(71) Applicants:Douyin Vision Co., Ltd., Beijing (CN); Bytedance Inc., Los Angeles, CA (US)

(72) Inventors: Xiangrui Liu, Beijing (CN); Meng Wang, Beijing (CN); Kai Zhang, San Diego, CA (US); Li Zhang, San Diego, CA (US)

(73) Assignees: DOUYIN VISION CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 19/055,032

(22) Filed: Feb. 17, 2025

(65) Prior Publication Data

US 2025/0203111 A1 Jun. 19, 2025

Related U.S. Application Data

(63) Continuation of application No. PCT/CN2023/113424, filed on Aug. 17, 2023.

(30) Foreign Application Priority Data

Aug. 17, 2022 (WO) ................ PCT/CN2022/112993

(51) Int. Cl.
H04N 19/597 (2014.01)
H04N 19/13 (2014.01)
(Continued)

(52) U.S. Cl.
CPC ........... H04N 19/597 (2014.11); H04N 19/13 (2014.11); H04N 19/136 (2014.11); H04N 19/30 (2014.11); H04N 19/503 (2014.11); H04N 19/60 (2014.11)

(58) Field of Classification Search
CPC .................................................... H04N 19/597
(Continued)

(56) References Cited

U.S. PATENT DOCUMENTS

2002/0041703 A1* 4/2002 Fox ...................... H04N 19/597
348/E13.071
2006/0275020 A1 12/2006 Sung
(Continued)

FOREIGN PATENT DOCUMENTS

CN 101980538 A 2/2011

OTHER PUBLICATIONS

Document: JVET-T1006-v1, Boyce, J., et al., "Annotated regions and shutter interval information SEI messages for AVC (Draft 2)," Joint Video Experts Team (JVET) of ITU-T SG 16 WP 3 and ISO/IEC JTC 1/SC 29 20th Meeting, by teleconference, Oct. 7-16, 2020, 26 pages.

(Continued)

*Primary Examiner* — Yulin Sun
(74) *Attorney, Agent, or Firm* — Conley Rose, P.C.

(57) ABSTRACT
A mechanism for processing video data is disclosed. The mechanism determines to apply an end-to-end lossless compression network to compress an input stereo image pair $\{x_L, x_R\}$ into bitstreams $\{b_L, b_R\}$. A conversion can then be performed between a visual media data and a bitstream based on the end-to-end lossless compression network.

19 Claims, 9 Drawing Sheets

(51) Int. Cl.
    *H04N 19/136*    (2014.01)
    *H04N 19/30*    (2014.01)
    *H04N 19/503*    (2014.01)
    *H04N 19/60*    (2014.01)

(58) Field of Classification Search
    USPC .......................................................... 348/42
    See application file for complete search history.

(56) References Cited

U.S. PATENT DOCUMENTS

2011/0074923 A1* 3/2011 Choi ................ H04N 21/47202
    348/43
2013/0083994 A1* 4/2013 Ren ........................... G06T 7/97
    382/154

OTHER PUBLICATIONS

Bao, Y., et al., "Quantitative Comparison of Lossless Video Compression for Multi-Camera Stereo and View Interpolation Applications," 2015 IEEE 13th International New Circuits and Systems Conference (NEWCAS), Jun. 10, 2015, 4 pages.
Feng, H-C., et al., "Visually Lossless Compression of Stereo Images," 2013 Data Compression Conference, Mar. 22, 2013, 27 pages.
International Search Report from PCT Application No. PCT/CN2023/113424 dated Oct. 19, 2023, 9 pages.

* cited by examiner

4000

4100

4200

SYSTEM AND METHOD FOR END-TO-END LOSSLESS STEREO IMAGE COMPRESSION

CROSS-REFERENCE TO RELATED APPLICATIONS

This patent application is a continuation of International Patent Application No. PCT/CN2023/113424, filed on Aug. 17, 2023, which claims the priority to and benefit of International Application No. PCT/CN2022/112993, filed on Aug. 17, 2022. All the aforementioned patent applications are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining to apply an end-to-end lossless compression network to compress an input stereo image pair $\{x_L, X_R\}$ into bitstreams $\{b_L, b_R\}$, where x represents an input stereo image, b represents one of the bitstreams, L represents left, and R represents right; and performing a conversion between the visual media data and the bitstreams based on the end-to-end lossless compression network.

Optionally, in any of the preceding aspects, another implementation of the aspect provides that the end-to-end lossless compression network comprises a multi-scale coding structure that derives multi-scale auxiliary representations $$\{z_L^s, z_R^s\}_{s=1}^S$$

from $\{x_L, X_R\}$ and establishes hierarchical dependencies between $\{x_L, X_R\}$ and $$\{z_L^s, z_R^s\}_{s=1}^S$$

as follows:

$$p(x_L, x_R \mid z_L^1, z_R^1, \ldots, z_L^S, z_R^S) =$$
$$p(x_L \mid z_L^1, z_R^1, \ldots, z_L^S, z_R^S) \cdot p(x_R \mid x_L, z_L^1, z_R^1, \ldots, z_L^S, z_R^S),$$

where, $$p(x_L \mid z_L^1, z_R^1, \ldots, z_L^S, z_R^S) = p(x_L \mid z_L^1, z_R^1) \cdot \prod_{s=1}^S p(z_L^s \mid z_L^{s+1}, z_R^{s+1}) \cdot p(z_L^S), \text{ and}$$

-continued
$$p(x_R \mid x_L, z_L^1, z_R^1, \ldots, z_L^S, z_R^S) =$$
$$p(x_R \mid x_L, z_L^1, z_R^1) \cdot \prod_{s=1}^S p(z_R^s \mid z_L^s, z_L^{s+1}, z_R^{s+1}) \cdot p(z_R^S).$$

where p represents a probability distribution, and where S represents scale.

Optionally, in any of the preceding aspects, another implementation of the aspect provides that S is 3.

Optionally, in any of the preceding aspects, another implementation of the aspect provides that S is a positive integer.

Optionally, in any of the preceding aspects, another implementation of the aspect provides that the end-to-end lossless compression network comprises an auto-encoder network configured to apply each scale to estimate $$p(z_L^s \mid z_L^{s+1}, z_R^{s+1}) \text{ and } p(z_R^s \mid z_L^s, z_L^{s+1}, z_R^{s+1}).$$

Optionally, in any of the preceding aspects, another implementation of the aspect provides that the auto-encoder network is configured to estimate probability distributions for $$\{z_L^s, z_R^s\},$$

and wherein the auto-encoder network comprises an encoder configured to generate non-quantized auxiliary representations $$\{y_L^{s+1}, y_R^{s+1}\}$$

based on previous scale non-quantized auxiliary representations $$\{y_L^s, y_R^s\}.$$

Optionally, in any of the preceding aspects, another implementation of the aspect provides that the encoder comprises N convolutional layers and M activation layers, and wherein N and M are each positive integers.

Optionally, in any of the preceding aspects, another implementation of the aspect provides that the encoder comprises N residual blocks.

Optionally, in any of the preceding aspects, another implementation of the aspect provides that the encoder comprises a non-linear function configured to convert an input signal to a high-order domain.

Optionally, in any of the preceding aspects, another implementation of the aspect provides that the auto-encoder network comprises a scale quantizer configured to quantize $$\{y_L^{s+1}, y_R^{s+1}\}$$

3 to quantized auxiliary representations $$\{z_L^{s+1}, z_R^{s+1}\},$$

with compression by entropy, coding according to $$p\left(z_L^s \middle| z_L^{s+1}, z_R^{s+1}\right) \text{ and } p\left(z_R^s \middle| z_L^s, z_L^{s+1}, z_R^{s+1}\right)$$

provided by the auto-encoder network at scale s+2.

Optionally, in any of the preceding aspects, another implementation of the aspect provides that the scale quantizer is configured to quantize using a rounding operation.

Optionally, in any of the preceding aspects, another implementation of the aspect provides that the auto-encoder network comprises a predictor configured to jointly estimate probability distribution $$p\left(z_L^s \middle| z_L^{s+1}, z_R^{s+1}\right) \text{ and } p\left(z_R^s \middle| z_L^s, z_L^{s+1}, z_R^{s+1}\right).$$

Optionally, in any of the preceding aspects, another implementation of the aspect provides that the predictor is configured to jointly estimate the probability distribution $$p\left(z_L^s \middle| z_L^{s+1}, z_R^{s+1}\right) \text{ and } p\left(z_R^s \middle| z_L^s, z_L^{s+1}, z_R^{s+1}\right)$$

based on intra-view and inter-view priors.

Optionally, in any of the preceding aspects, another implementation of the aspect provides that the predictor comprises an interview interaction module and an entropy model.

Optionally, in any of the preceding aspects, another implementation of the aspect provides that the interview interaction module comprises a semi-coupled inter-view interaction module configured to extract view-sharing information as effective inter-view information.

Optionally, in any of the preceding aspects, another implementation of the aspect provides that the entropy model comprises a joint conditional entropy model configured to jointly estimate distributions of left and right views in accordance with the intra-view and the inter-view prior information.

Optionally, in any of the preceding aspects, another implementation of the aspect provides that the semi-coupled inter-view interaction module is configured to extract the inter-view prior information from input stereo features $\{f_L, f_R\}$ and yield enhanced stereo features $\{\bar{f}_L, \bar{f}_R\}$ by incorporating the inter-view prior information with $\{f_L, f_R\}$.

Optionally, in any of the preceding aspects, another implementation of the aspect provides that the inter-view interaction module includes a semi-coupled extraction block configured to extract view-shared information and generate semi-coupled features.

Optionally, in any of the preceding aspects, another implementation of the aspect provides that the inter-view interaction module includes a parallax interaction transformer configured to extract complementary information from semi-coupled features and to generate inter-view features.

Optionally, in any of the preceding aspects, another implementation of the aspect provides that the inter-view interaction module includes a nonlinear transformation block configured to fuse input features with inter-view features and to generate enhanced features, or combinations thereof.

Optionally, in any of the preceding aspects, another implementation of the aspect provides that the semi-coupled extraction block is configured to extract semi-coupled features $\{\bar{f}_L, \bar{f}_R\}$ from input stereo features $\{f_L, f_R\}$ that retain view-shared information while suppressing view-specific information, and wherein the semi-coupled extraction block comprises a multi-stage extraction module, a semi-coupled depth-wise separable convolution, and a fusion module.

Optionally, in any of the preceding aspects, another implementation of the aspect provides that the semi-coupled extraction block employs a multi-stage extraction strategy to progressively extract the view-shared information.

Optionally, in any of the preceding aspects, another implementation of the aspect provides that a semi-coupled depth-wise separable convolution is applied to each stage c to extract semi-coupled features $$\{s_L^c, s_R^c\}$$

according to:

$$s_L^c = f_L^{c-1} * \Phi_S^c, f_L^c = f_L^{c-1} * \Phi_L^c,$$

$$s_R^c = f_R^{c-1} * \Phi_S^c, f_R^c = f_R^{c-1} * \Phi_R^c,$$

where * is the depth-wise convolution operation, $$\Phi_S^c$$

is the view-shared convolution kernels and $$\{\Phi_L^c, \Phi_R^c\}$$

are view-specific convolution kernels for the left and right views, respectively.

Optionally, in any of the preceding aspects, another implementation of the aspect provides that the semi-coupled extraction block employs a fusion module to fuse output semi-coupled features from each stage to generate final semi-coupled features as follows:

$$\bar{f}_L = G_L\left(s_L^1 \oplus s_L^2 \ldots \oplus s_L^s\right),$$

$$\bar{f}_R = G_R\left(s_R^1 \oplus s_R^2 \ldots \oplus s_R^s\right),$$

where $\{G_L, G_R\}$ are gather blocks.

Optionally, in any of the preceding aspects, another implementation of the aspect provides that the parallax interaction transformer is configured to extract complementary information from semi-coupled features $\{\bar{f}_L, \bar{f}_R\}$ based on stereo features $\{f_L, f_R\}$ and generate inter-view features $$\{f_L^\star, f_R^\star\}.$$

Optionally, in any of the preceding aspects, another implementation of the aspect provides that the parallax interaction transformer comprises an interaction structure that extracts complementary information from $\bar{f}_R$ according to $f_L$ and extracts complementary information from $\bar{f}_L$ according to $f_R$.

Optionally, in any of the preceding aspects, another implementation of the aspect provides that the parallax interaction transformer comprises a parallax transformer configured to extract complementary information along a parallax direction.

Optionally, in any of the preceding aspects, another implementation of the aspect provides that the parallax transformer extracts complementary information from $\bar{f}_R$ according to $f_L$.

Optionally, in any of the preceding aspects, another implementation of the aspect provides that a query vector, key vectors, and value vectors are generated by linear layers as follows:

$$q_L = \text{Linear}_q(f_L),\ k_R = \text{Linear}_k(\bar{f}_R),\ v_R = \text{Linear}_v(\bar{f}_R).$$

Optionally, in any of the preceding aspects, another implementation of the aspect provides that a squeeze operation is configured to squeeze the query vector, key vectors, and value vectors along a vertical direction as follows: $\tilde{P}_L=\text{Squeeze}\ (f_L)$, $\tilde{K}_R=\text{Squeeze}\ (\bar{f}_R)$, $\tilde{v}_R=\text{Squeeze}\ (\bar{f}_R)$, where $\text{Squeeze}(\cdot){:}\mathbb{R}^{B\times C\times H\times W}\to\mathbb{R}^{(B\times H)\times C\times W}$ comprises the squeeze operation.

Optionally, in any of the preceding aspects, another implementation of the aspect provides that a scaled dot-product attention is performed along a parallax direction followed by a feed-forward network to produce inter-view features $$f_L^*$$

according to:

$$o_L = v_L \times \text{Softmax}\left(\frac{q_R \times k_R}{\sqrt{d_k}}\right),$$

$$f_L^* = o_L + \text{FFN}(q_L + o_L),$$

in which Softmax$(\cdot)$ denotes a softmax operation, $d_k$ denotes a scale factor and FFN$(\cdot)$ denotes the feed-forward network.

Optionally, in any of the preceding aspects, another implementation of the aspect provides that the parallax transformer is configured to extract complementary information from $\bar{f}_L$ according to $f_R$ and generate inter-view features $$f_R^*\ \text{or}\ f_L^*.$$

Optionally, in any of the preceding aspects, another implementation of the aspect provides that the nonlinear transformation block is configured to fuse input features $\{f_L, f_R\}$ with inter-view features $$\{f_L^*, f_R^*\},$$

yielding enhanced features $\{\tilde{f}_L, \tilde{f}_R\}$ according to:

$$\tilde{f}_L = f_L + H_L(f_L \oplus f_L^*),$$

$$\tilde{f}_R = f_R + H_R(f_R \oplus f_R^*),$$

where $\{H_L,\ H_R\}$ denotes the nonlinear transformations implemented by a neural network.

Optionally, in any of the preceding aspects, another implementation of the aspect provides that the joint conditional entropy model is configured to jointly estimate probability distributions of stereo views.

Optionally, in any of the preceding aspects, another implementation of the aspect provides that the probability distributions of stereo views includes a probability dependency for auxiliary representations and corresponding entropy model.

Optionally, in any of the preceding aspects, another implementation of the aspect provides that the probability distributions of stereo views includes a probability dependency for stereo images and corresponding entropy model.

Optionally, in any of the preceding aspects, another implementation of the aspect provides that the probability dependency for auxiliary representations and corresponding entropy model are configured to estimate probability distributions of left-view auxiliary representations $$z_L^S$$

based on prediction features $$g_L^{s+1}$$

which contain intra- and inter-view information.

Optionally, in any of the preceding aspects, another implementation of the aspect provides that the probability dependency for auxiliary representations and corresponding entropy model are configured to encode and decode left-view auxiliary representations $$z_L^s$$

based on estimated probability distributions of left-view auxiliary representations $$p\!\left(z_L^s\big|g_L^{s+1}\right).$$

Optionally, in any of the preceding aspects, another implementation of the aspect provides that the probability dependency for auxiliary representations and corresponding entropy model are configured to use the decoded left-view auxiliary representations $$z_L^s$$

to provide supplementary information to model the probability distribution of right-view auxiliary representations $$z_R^s.$$

Optionally, in any of the preceding aspects, another implementation of the aspect provides that the probability dependency for auxiliary representations and corresponding entropy model are configured to encode and decode right-view auxiliary representations $$z_R^s$$

based on estimated probability distributions of right-view auxiliary representations $$p(z_R^s \mid z_L^s, g_R^{s+1}).$$

Optionally, in any of the preceding aspects, another implementation of the aspect provides that the probability dependency for stereo images and corresponding entropy model are configured to construct interlace dependencies between stereo images $\{x_L, x_R\}$.

Optionally, in any of the preceding aspects, another implementation of the aspect provides that construction of the interlace dependencies between stereo images comprises dividing $\{x_L, x_R\}$ along channels into sub-images $\{x_{L,1}, x_{L,2}, x_{L,3}\}$ and $\{x_{R,1}, x_{R,2}, x_{R,3}\}$.

Optionally, in any of the preceding aspects, another implementation of the aspect provides that construction of the interlace dependencies between stereo images comprises estimating probability distributions of sub-images $\{x_{L,1}, x_{R,1}\}$ then compressing them.

Optionally, in any of the preceding aspects, another implementation of the aspect provides that compression of the probability distributions of sub-images comprises estimating probability distributions of the sub-image $x_{L,1}$ based on prediction features $$g_L^1$$

which contain intra-view and inter-view information.

Optionally, in any of the preceding aspects, another implementation of the aspect provides that compression of the probability distributions of sub-images comprises encoding and decoding $x_{L,1}$ based on estimated probability distributions of left-view auxiliary representations $$p(x_{L,1} \mid g_L^1).$$

Optionally, in any of the preceding aspects, another implementation of the aspect provides that compression of the probability distributions of sub-images comprises using the decoded $x_{L,1}$ to provide supplementary information to model the probability distribution of sub-image $x_{R,1}$.

Optionally, in any of the preceding aspects, another implementation of the aspect provides that compression of the probability distributions of sub-images comprises encoding and decoding the sub-image $x_{R,1}$ based on estimated probability distributions $$p(x_{R,1} \mid x_{L,1}, g_R^1).$$

Optionally, in any of the preceding aspects, another implementation of the aspect provides that construction of the interlace dependencies between stereo images comprises estimating probability distributions of sub-images $\{x_{L,2}, x_{R,2}\}$ conditioned on decoded $\{x_{L,1}, x_{R,1}\}$ then compressing them.

Optionally, in any of the preceding aspects, another implementation of the aspect provides that estimating probability distributions of sub-images comprises estimating probability distributions of the sub-image $x_{L,2}$ based on prediction features $$g_L^1$$

and $\{x_{L,1}, x_{R,1}\}$.

Optionally, in any of the preceding aspects, another implementation of the aspect provides that estimating probability distributions of sub-images comprises encoding and decoding $x_{L,2}$ based on estimated probability distributions of left-view auxiliary representations $$p(x_{L,2} \mid g_L^1, x_{L,1}, x_{R,1}).$$

Optionally, in any of the preceding aspects, another implementation of the aspect provides that estimating probability distributions of sub-images comprises using the decoded $x_{L,2}$ to provide supplementary information to model the probability distribution of sub-image $x_{R,2}$.

Optionally, in any of the preceding aspects, another implementation of the aspect provides that estimating probability distributions of sub-images comprises encoding and decode the sub-image $x_{R,2}$ based on estimated probability distributions $$p(x_{R,2} \mid x_{L,2}, g_R^1, x_{L,1}, x_{R,1}).$$

Optionally, in any of the preceding aspects, another implementation of the aspect provides that construction of the interlace dependencies between stereo images comprises estimating probability distributions of sub-images $\{x_{L,3}, x_{R,3}\}$ conditioned on decoded $\{x_{L,1}, x_{R,1}, x_{L,2}, x_{R,2}\}$ then compressing them.

Optionally, in any of the preceding aspects, another implementation of the aspect provides that estimating probability distributions of sub-images comprises estimating probability distributions of the sub-image $x_{L,3}$ based on prediction features $$g_L^1$$

and $\{x_{L,1}, x_{R,1}, x_{L,2}, x_{R,2}\}$.

Optionally, in any of the preceding aspects, another implementation of the aspect provides that estimating probability distributions of sub-images comprises encoding and decoding $x_{L,3}$ based on estimated probability distributions of left-view auxiliary representations $$p(x_{L,3}|g_L^1, x_{L,1}, x_{R,1}, x_{L,2}, x_{R,2}).$$

Optionally, in any of the preceding aspects, another implementation of the aspect provides that estimating probability distributions of sub-images comprises using the decoded $x_{L,3}$ to provide supplementary information to model the probability distribution of sub-image $x_{R,3}$.

Optionally, in any of the preceding aspects, another implementation of the aspect provides that estimating probability distributions of sub-images comprises encoding and decoding the sub-image $x_{R,3}$ based on estimated probability distributions $$p(x_{R,3}|x_{L,3}, g_R^1, x_{L,1}, x_{R,1}, x_{L,2}, x_{R,2}).$$

Optionally, in any of the preceding aspects, another implementation of the aspect provides that the method further comprises leveraging multiple encoders to derives multi-scale auxiliary representations $$\{z_L^s, z_R^s\}_{s=1}^S$$

from $\{x_L, x_R\}$ as follows:

$$z_L^s = \begin{cases} E_L^s(x_L), & s = 1, \\ E_L^s(z_L^{s-1}), & s = 2,3, \dots, S \end{cases}$$

$$z_R^s = \begin{cases} E_R^s(x_R), & s = 1, \\ E_R^s(z_R^{s-1}), & s = 2,3, \dots, S \end{cases}$$

where $$\{E_L^s(\cdot), E_R^s(\cdot)\}$$

denote encoders at scale s.

Optionally, in any of the preceding aspects, another implementation of the aspect provides that the method further comprises establishing hierarchical dependencies between $\{x_L, x_R\}$ and $$\{z_L^s, z_R^s\}_{s=1}^S$$

as follows:

$$p(x_L, x_R \mid z_L^1, z_R^1, \dots, z_L^S, z_R^S) =$$
$$p(x_L \mid z_L^1, z_R^1, \dots, z_L^S, z_R^S) \cdot p(x_R \mid x_L, z_L^1, z_R^1, \dots, z_L^S, z_R^S),$$

where, $$p(x_L \mid z_L^1, z_R^1, \dots, z_L^S, z_R^S) = p(x_L \mid z_L^1, z_R^1) \cdot \prod_{s=1}^S p(z_L^s \mid z_L^{s+1}, z_R^{s+1}) \cdot p(z_L^S),$$

$$p(x_R \mid x_L, z_L^1, z_R^1, \dots, z_L^S, z_R^S) =$$
$$p(x_R \mid x_L, z_L^1, z_R^1) \cdot \prod_{s=1}^S p(z_R^s \mid z_L^s, z_L^{s+1}, z_R^{s+1}) \cdot p(z_R^S),$$

Optionally, in any of the preceding aspects, another implementation of the aspect provides that the method further comprises leveraging multiple predictors to estimate factorized distributions.

Optionally, in any of the preceding aspects, another implementation of the aspect provides that the method further comprises providing a predictor that estimates distributions $$p(z_L^{s-1}, z_R^{s-1} \mid z_L^s, z_R^s)$$

using neural networks to provide prediction features $$\{g_L^s, g_R^s\},$$

in which the semi-coupled inter-view interaction module (SI²M) is introduced to extract inter-view information, and wherein the the process is formulated as follows:

$$g_L^s, g_R^s = P(z_L^s, z_R^s, g_L^{s+1}, g_R^{s+1}),$$

in which P(·) indicates the predictor.

Optionally, in any of the preceding aspects, another implementation of the aspect provides that the method further comprises using the jointly conditional entropy model (JCEM) to estimate distributions $$p(z_L^{s-1}, z_R^{s-1} \mid z_L^s, z_R^s).$$

Optionally, in any of the preceding aspects, another implementation of the aspect provides that the method further comprises providing a semi-coupled inter-view interaction module to yield enhanced features that contain both intra-view and inter-view information as effective priors by leveraging semi-coupled extraction (SE) block to extract semi-coupled features $\{\tilde{f}_L, \tilde{f}_R\}$ from input stereo features $\{f_L, f_R\}$ that retain view-shared information while suppressing the view-specific information.

Optionally, in any of the preceding aspects, another implementation of the aspect provides that the method further comprises conducting progressively extraction that contains C stages.

Optionally, in any of the preceding aspects, another implementation of the aspect provides that the method further comprises leveraging a semi-coupled depth-wise separable convolution applied to each stage c to extract semi-coupled features $$\{s_L^c, s_R^c\}$$

The process can be formulated as:

$$s_L^c = f_L^{c-1} * \Phi_S^c,\ f_L^c = f_L^{c-1} * \Phi_L^c,$$
$$s_R^c = f_R^{c-1} * \Phi_S^c,\ f_R^c = f_R^{c-1} * \Phi_R^c,$$

where $*$ is the depth-wise convolution operation, $$\Phi_S^c$$

is the view-shared convolution kernels and $$\{\Phi_L^c, \Phi_R^c\}$$

are view-specific convolution kernels for the left and right views, respectively.

Optionally, in any of the preceding aspects, another implementation of the aspect provides that the method further comprises leveraging a fusion module to fuse output semi-coupled features from each stage to generate final semi-coupled features as follows:

$$\bar{f}_L = G_L(s_L^1 \oplus s_L^2 \ldots \oplus s_L^S),$$
$$\bar{f}_R = G_R(s_R^1 \oplus s_R^2 \ldots \oplus s_R^S),$$

where $\{G_L, G_R\}$ are gather blocks implemented by stacked $1 \times 1$ convolution layers.

Optionally, in any of the preceding aspects, another implementation of the aspect provides that the method further comprises leveraging a parallax interaction transformer to extract complementary information from semi-coupled features $\{\bar{f}_L, \bar{f}_R\}$ based on stereo features $\{f_L, f_R\}$ and generate inter-view features $$\{f_L^\star, f_R^\star\}.$$

Optionally, in any of the preceding aspects, another implementation of the aspect provides conducting an inter-action structure that extracts complementary information from $\bar{f}_R$ according to $f_L$ and extracts complementary information from $\bar{f}_L$ according to $f_R$.

Optionally, in any of the preceding aspects, another implementation of the aspect provides leveraging a parallax transformer that extracts complementary information along the parallax direction.

Optionally, in any of the preceding aspects, another implementation of the aspect provides that the parallax transformer extracts complementary information from $\bar{f}_R$ according to $f_L$.

Optionally, in any of the preceding aspects, another implementation of the aspect provides that the query vector, key vectors, and value vectors are generated by linear layers as follows:

$$q_L = \mathrm{Linear}_q(f_L),\ k_R = \mathrm{Linear}_k(\bar{f}_R),\ v_R = \mathrm{Linear}_v(\bar{f}_R).$$

Optionally, in any of the preceding aspects, another implementation of the aspect provides that the query vector, the key vectors, and the value vectors are squeezed along the vertical direction as follows:

$$\hat{p}_L = \mathrm{Squeeze}(f_L),\ \hat{k}_R = \mathrm{Squeeze}(\bar{f}_R),\ \hat{v}_R = \mathrm{Squeeze}(\bar{f}_R)$$

where $\mathrm{Squeeze}(\cdot)$: $\mathbb{R}^{B \times C \times H \times W} \to \mathbb{R}^{(B \times H) \times C \times W}$ is the squeeze operation.

Optionally, in any of the preceding aspects, another implementation of the aspect provides that the scaled dot-product attention is further performed along the parallax direction, which is a horizontal direction, followed by the feed-forward network to produce inter-view features $$f_L^*,$$

i.e., $$o_L = v_L \times \mathrm{Softmax}\left(\frac{q_R \times k_R}{\sqrt{d_k}}\right),$$
$$f_L^* = o_L + FFN(q_L + o_L),$$

in which $\mathrm{Softmax}(\cdot)$ denotes the softmax operation, $d_k$ denotes the scale factor and $FFN(\cdot)$ denotes the feed-forward network.

Optionally, in any of the preceding aspects, another implementation of the aspect provides that the parallax transformer extracts complementary information from $\bar{f}_L$ according to $f_R$ and generate inter-view features $$f_R^* \text{ or } f_L^*.$$

Optionally, in any of the preceding aspects, another implementation of the aspect provides that the method further comprises leveraging a nonlinear transformation block according to claim 4 that fuses input features $\{f_L, f_R\}$ with inter-view features $$\{f_L^*, f_R^*\},$$

yielding enhanced features $\{\bar{f}_L, \bar{f}_R\}$. This process can be formulated as follows:

$$\hat{f}_L = f_L + H_L(f_L \oplus f_L^*),$$

$$\hat{f}_R = f_R + H_R(f_R \oplus f_R^*),$$

where $\{H_L, H_R\}$ denotes the nonlinear transformations implemented by stacked 1×1 convolution layers.

Optionally, in any of the preceding aspects, another implementation of the aspect provides that the method further comprises providing a joint conditional entropy model to jointly estimates probability distributions of stereo views constructing a probability dependency for auxiliary representations $$\{z_L^s, z_R^s\}.$$

Optionally, in any of the preceding aspects, another implementation of the aspect provides that the method further comprises estimating probability distributions of left-view auxiliary representations $$z_L^s$$

based on prediction features $$g_L^{s+1}$$

which contain intra- and inter-view information.

Optionally, in any of the preceding aspects, another implementation of the aspect provides parametrically modeling the distributions $$p(z_L^s \mid g_L^{s+1})$$

using the logistic mixture model as follows:

$$p(z_L^s \mid g_L^{s+1}) \sim \mathcal{L}(\mu_L^s, \sigma_L^s, \pi_L^s),$$

where $$\{\mu_L^s, \sigma_L^s, \pi_L^s\}$$

are parameters corresponding to the logistic mixture model.

Optionally, in any of the preceding aspects, another implementation of the aspect provides using neural networks to estimate $$\{\mu_L^s, \sigma_L^s, \pi_L^s\}$$

as follows:

$$\{\mu_L^s, \sigma_L^s, \pi_L^s\} = H_L(g_L^{s+1}),$$

where $H_L(\cdot)$ denotes the estimator implemented by stacked 3×3 convolution layers.

Optionally, in any of the preceding aspects, another implementation of the aspect provides generating estimated distributions $$p(z_L^s \mid g_L^{s+1}).$$

Optionally, in any of the preceding aspects, another implementation of the aspect provides encoding and decoding left-view auxiliary representations $$z_L^s$$

based on estimated probability distributions of left-view auxiliary representations $$p(z_L^s \mid g_L^{s+1}).$$

Optionally, in any of the preceding aspects, another implementation of the aspect provides leveraging the decoded left-view auxiliary representations $$z_L^s$$

to provide supplementary information to model the probability distribution of right-view auxiliary representations $$z_R^s.$$

Optionally, in any of the preceding aspects, another implementation of the aspect provides parametrically modeling the distributions $$p(z_R^s \mid z_L^s, g_R^{s+1})$$

using the logistic mixture model as follows:

$$p(z_R^s \mid z_L^s, g_R^{s+1}) \sim \mathcal{L}(\mu_R^s, \sigma_R^s, \pi_R^s),$$

where $$\{\mu_L^s, \sigma_L^s, \pi_L^s\}$$

are parameters corresponding to the logistic mixture model.

Optionally, in any of the preceding aspects, another implementation of the aspect provides using neural networks to estimate $$\{\mu_R^s, \sigma_R^s, \pi_R^s\}$$

as follows:

$$\{\mu_R^s, \sigma_R^s, \pi_R^s\} = H_R(g_R^{s+1} \oplus z_L^s),$$

where $H_R(\cdot)$ denotes the estimator implemented by stacked 3×3 convolution layers and $\oplus$ denotes the channel-wise concatenation.

Optionally, in any of the preceding aspects, another implementation of the aspect provides generating estimated distributions $$p(z_R^s \mid z_L^s, g_R^{s+1}).$$

Optionally, in any of the preceding aspects, another implementation of the aspect provides encoding and decoding right-view auxiliary representations $$z_R^s$$

based on estimated probability distributions of right-view auxiliary representations $$p(z_R^s \mid z_L^s, g_R^{s+1}).$$

Optionally, in any of the preceding aspects, another implementation of the aspect provides constructing a probability dependency for auxiliary representations $\{x_L, x_R\}$.

Optionally, in any of the preceding aspects, another implementation of the aspect provides constructing interlace dependencies between stereo images $\{x_L, x_R\}$.

Optionally, in any of the preceding aspects, another implementation of the aspect provides dividing $\{x_L, x_R\}$ along channels into sub-images $\{x_{L,1}, x_{L,2}, x_{L,3}\}$ and $\{x_{R,1}, x_{R,2}, x_{R,3}\}$.

Optionally, in any of the preceding aspects, another implementation of the aspect provides estimating probability distributions of sub-images $\{x_{L,1}, x_{R,1}\}$ and then compressing them.

Optionally, in any of the preceding aspects, another implementation of the aspect provides estimating probability distributions of the sub-image $x_{L,1}$ based on prediction features $$g_L^1$$

which contain intra- and inter-view information.

Optionally, in any of the preceding aspects, another implementation of the aspect provides encoding and decoding $x_{L,1}$ based on estimated probability distributions of left-view auxiliary representations $$p(x_{L,1} \mid g_L^1).$$

Optionally, in any of the preceding aspects, another implementation of the aspect provides that leveraging the decoded $x_{L,1}$ to provide supplementary information to model the probability distribution of sub-image $x_{R,1}$.

Optionally, in any of the preceding aspects, another implementation of the aspect provides encoding and decoding the sub-image $x_{R,1}$ based on estimated probability distributions $$p(x_{R,1} \mid x_{L,1}, g_R^1).$$

Optionally, in any of the preceding aspects, another implementation of the aspect provides estimating probability distributions of sub-images $\{x_{L,2}, x_{R,2}\}$ conditioned on decoded $\{x_{L,1}, x_{R,1}\}$ and then compressing them.

Optionally, in any of the preceding aspects, another implementation of the aspect provides estimating probability distributions of the sub-image $x_{L,2}$ based on prediction features $$g_L^1$$

and $\{x_{L,1}, x_{R,1}\}$.

Optionally, in any of the preceding aspects, another implementation of the aspect provides that encoding and decoding $x_{L,2}$ based on estimated probability distributions of left-view auxiliary representations $$p(x_{L,2} \mid g_L^1, x_{L,1}, x_{R,1}).$$

Optionally, in any of the preceding aspects, another implementation of the aspect provides leveraging the decoded $x_{L,2}$ to provide supplementary information to model the probability distribution of sub-image $x_{R,2}$.

Optionally, in any of the preceding aspects, another implementation of the aspect provides encoding and decoding the sub-image $x_{R,2}$ based on estimated probability distributions $$p(x_{R,2} \mid x_{L,2}, g_R^1, x_{L,1}, x_{R,1}).$$

Optionally, in any of the preceding aspects, another implementation of the aspect provides estimating probability distributions of sub-images $\{x_{L,3}, x_{R,3}\}$ conditioned on decoded $\{x_{L,1}, x_{R,1}, x_{L,2}, x_{R,2}\}$ and then compressing them.

Optionally, in any of the preceding aspects, another implementation of the aspect provides estimating probability distributions of the sub-image $x_{L,3}$ based on prediction features $$g_L^1$$

and $\{x_{L,1}, x_{R,1}, x_{L,2}, x_{R,2}\}$.

Optionally, in any of the preceding aspects, another implementation of the aspect provides encoding and decoding $x_{L,3}$ based on estimated probability distributions of left-view auxiliary representations $$p(x_{L,3} \mid g_L^1, x_{L,1}, x_{R,1}, x_{L,2}, x_{R,2}).$$

Optionally, in any of the preceding aspects, another implementation of the aspect provides leveraging the decoded $x_{L,3}$ to provide supplementary information to model the probability distribution of sub-image $x_{R,3}$.

Optionally, in any of the preceding aspects, another implementation of the aspect provides comprising encoding and decoding the sub-image $x_{R,3}$ based on estimated probability distributions $$p(x_{R,3} \mid x_{L,3}, g_R^1, x_{L,1}, x_{R,1}, x_{L,2}, x_{R,2}).$$

A second aspect relates to an apparatus for processing video data comprising: a processor; and a non-transitory memory with instructions thereon, wherein the instructions upon execution by the processor, cause the processor to perform any of the preceding aspects.

A third aspect relates to non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A fourth aspect relates to a non-transitory computer-readable recording medium storing a bitstream of a video which is generated by a method performed by a video processing apparatus, wherein the method comprises any of the disclosed methods.

A fifth aspect relates to a method for storing a bitstream of a video comprising any of the disclosed methods.

A sixth aspect relates to a method, apparatus, or system described in the present disclosure.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
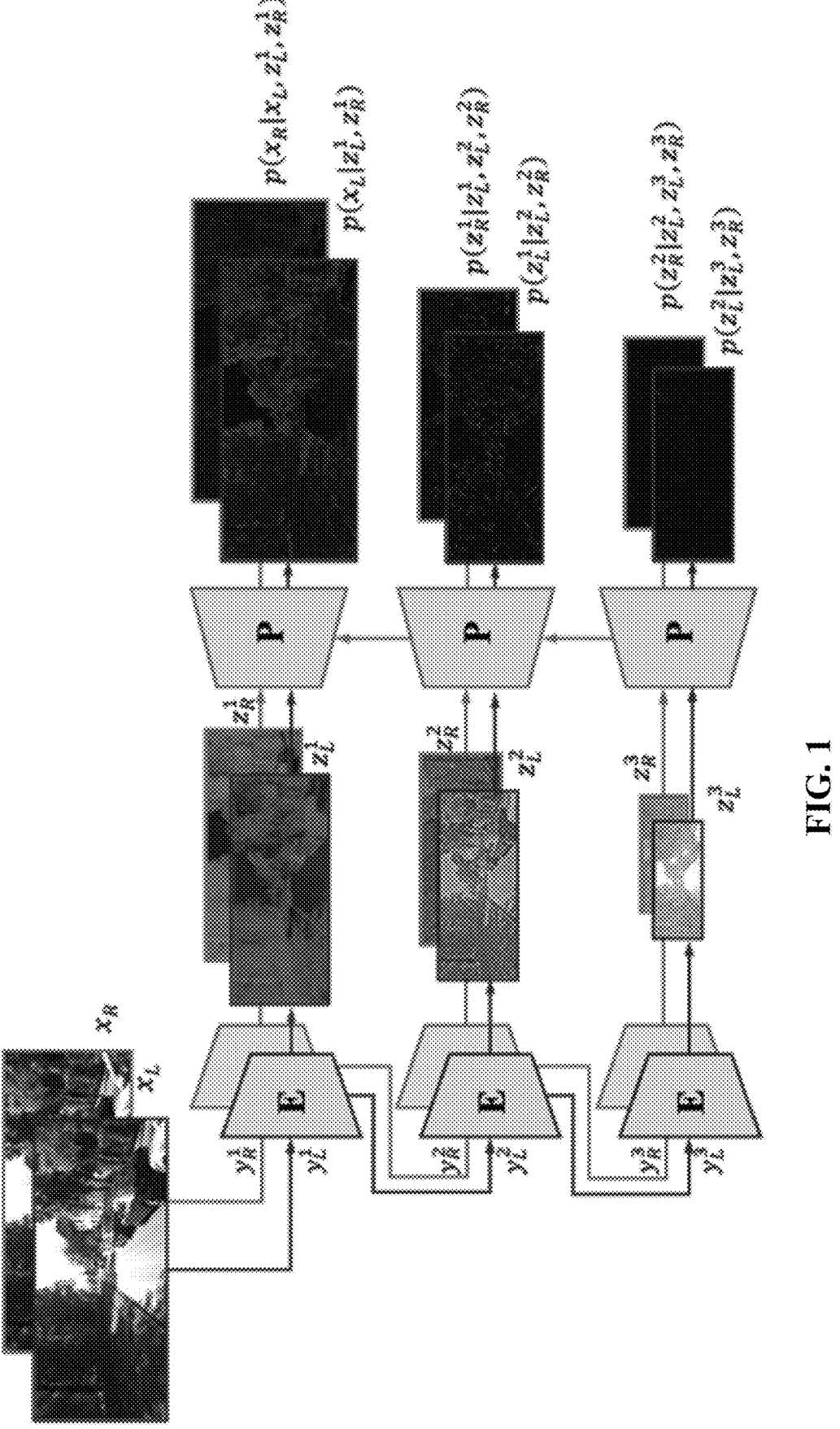
FIG. 1 illustrates an example framework for a first example embodiment.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Section headings are used in the present disclosure for case of understanding and do not limit the applicability of techniques and embodiments disclosed in each section only to that section. Furthermore, the techniques described herein are applicable to other video codec protocols and designs.

1. Initial Discussion

This disclosure is related to the field of image compression, particularly to an end-to-end stereo image compression system and method.

Stereo image compression is one of the key technologies in the field of digital image processing with the aim of reducing the redundancy in stereo images and compress them to compact bitstreams. In stereo image compression, inter-view redundancy needs to be tackled in addition to the spatial redundancy. Accordingly, several compression methods, including both codec based methods and end-to-end methods are reported to improve the coding efficiency. The history of traditional stereo image compression can trace back to the 1980s, and these methods typically adopt the disparity compensation prediction (DCP) to reduce the inter-view redundancy. Specifically, an example stereo image compression method is based on DCP, in which the left view is compressed independently, followed by the block-wise disparity estimation and compensation to yield an inter-view prediction for the right view. For those blocks whose prediction error is less that the threshold, the prediction is assigned as the reconstruction and only the predicted disparity map is compressed and transmitted, while remaining blocks in the right view are directly encoded. In another example, DCP is used to predict the right view and designed a special codec that is accommodated to the characteristic of prediction residuals. In an example, a wavelet-based stereo image compression scheme is used, in which the binocular compensation/suppression process based on human vision system is designed to reduce inter-view redundancies. Inspired by the tremendous success of end-to-end single image compression, several end-to-end stereo image compression methods have been proposed. In another example, deep stereo image compression (DSIC) is used, in which a parametric skip function is designed to share the information from of the left view with the right-view coding branch. In another example, a stereo image compression network based on homography transformation is used, namely HESIC, to perform inter-view prediction using the homography matrix. In another example, an end-to-end stereo image compression method is used via bi-directional coding, namely BCSIC-Net. The proposed BCSIC-Net consists of a bi-directional contextual transform module and a bi-directional conditional entropy model to improve coding efficiency. As for the lossless compression for stereo image, an example an end-to-end lossless stereo image compression method named L3C-Stereo is used, in which two coding branches based on L3C are leveraged to encode the left view and right view, respectively. Specifically, the left-view image is first compressed independently, and the decoded images are further warped to the right view by the estimated disparity as conditional prior for the probability estimation in the right-view coding branch.

2. Technical Problems Solved by Disclosed Technical Solutions

Methods for lossless stereo image compression have the following problems.

Many compression methods are designed for lossy compression, where both the nonlinear transformation and the quantization in these methods causes information loss. Therefore, these methods cannot be used to compress stereo images in a lossless manner.

Many compression methods designed for lossless compression do not fully exploit the inter-view correlation. That is, the left-view images are impotent for conditioning on any inter-view priors, resulting in the sub-optimal coding performance.

Many compression methods designed for lossless compression require multiple auxiliary disparity estimation modules, leading to a sophisticated network architecture.

Many compression methods designed for lossless compression require multiple training stages.

3. A Listing of Solutions and Embodiments

To solve the above-described problems, methods as summarized below are disclosed. The embodiments should be considered as examples to explain the general concepts and should not be interpreted in a narrow way. Furthermore, these embodiments can be applied individually or combined in any manner. To solve the problems listed above, one or more of the following approaches are disclosed.

Example 1

In an example, an end-to-end lossless compression network for stereo images that compresses input stereo image pair $\{x_L, x_R\}$ into bitstreams $\{b_L, b_R\}$. In one example, a multi-scale coding structure that derives multi-scale auxiliary representations $$\{z_L^s, z_R^s\}_{s=1}^S$$

from $\{x_L, x_R\}$ and establishes hierarchical dependencies between $\{x_L, x_R\}$ and $$\{z_L^s, z_R^s\}_{s=1}^S$$

as follows:

$$p(x_L, x_R \mid z_L^1, z_R^1, \ldots, z_L^S, z_R^S) =$$
$$p(x_L \mid z_L^1, z_R^1, \ldots, z_L^S, z_R^S) \cdot p(x_R \mid x_L, z_L^1, z_R^1, \ldots, z_L^S, z_R^S),$$

where, $$p(x_L \mid z_L^1, z_R^1, \ldots, z_L^S, z_R^S) = p(x_L \mid z_L^1, z_R^1) \cdot \prod_{s=1}^S p(z_L^s \mid z_L^{s+1}, z_R^{s+1}) \cdot p(z_L^S),$$

$$p(x_R \mid x_L, z_L^1, z_R^1, \ldots, z_L^S, z_R^S) =$$
$$p(x_R \mid x_L, z_L^1, z_R^1) \cdot \prod_{s=1}^S p(z_R^s \mid z_L^s, z_L^{s+1}, z_R^{s+1}) \cdot p(z_R^S).$$

In one example, S is 3. In one example, S is a positive integer. In one example, an auto-encoder network is applied to each scale to estimate $$p(z_L^s \mid z_L^{s+1}, z_R^{s+1}) \text{ and } p(z_R^s \mid z_L^s, z_L^{s+1}, z_R^{s+1}).$$

Example 2

In one example, an auto-encoder network according to example 1 estimates probability distributions for $$\{z_L^s, z_R^s\},$$

comprising: an encoder that generates non-quantized auxiliary representations $$\{y_L^{s+1}, y_R^{s+1}\}$$

based on previous scale non-quantized auxiliary representations $$\{y_L^s, y_R^s\}.$$

In one example, the encoder may be composed with N convolutional layers and M activation layers. In one example, the encoder may be composed with N residual blocks. In one example, the encoder may be a non-linear function that converts the input signal to high-order domain.

In one example, a scale quantizer that quantizes $$\{y_L^{s+1}, y_R^{s+1}\}$$

to quantized auxiliary representations $$\{z_L^{s+1}, z_R^{s+1}\},$$

with compressed by the entropy coding according to $$p(z_L^s \mid z_L^{s+1}, z_R^{s+1}) \text{ and}$$

$$p(z_R^s \mid z_L^s, z_L^{s+1}, z_R^{s+1})$$

provided by the auto-encoder network at scale s+2. In one example, the quantizer may be achieved by the rounding operation.

In one example, a predictor jointly estimates probability distributions $$p(z_L^s \mid z_L^{s+1}, z_R^{s+1}) \text{ and } p(z_R^s \mid z_L^s, z_L^{s+1}, z_R^{s+1}).$$

Example 3

In one example, a predictor according to example 2 jointly estimates $$p(z_L^s \mid z_L^{s+1}, z_R^{s+1}) \text{ and } p(z_R^s \mid z_L^s, z_L^{s+1}, z_R^{s+1})$$

based on intra-view and inter-view priors. The predictor includes an inter-view interaction module and an entropy model. In one example, the inter-view interaction module may be a semi-coupled inter-view interaction module that extracts view-sharing information as effective inter-view prior information. In one example, the entropy model may be a joint conditional entropy model that jointly estimates distributions of left and right views with the consideration of intra-view and inter-view prior information.

Example 4

In one example, a semi-coupled inter-view interaction module according to example 3 extracts the inter-view prior information from input stereo features $\{f_L, f_R\}$ and yield enhanced stereo features $\{\bar{f}_L, \bar{f}_R\}$ by incorporating the inter-view prior information with $\{f_L, f_R\}$. In one example, the semi-coupled inter-view interaction module may include semi-coupled extraction block to extract view-shared information and generate semi-coupled features. In one example, the semi-coupled inter-view interaction module may include a parallax interaction transformer to extract complementary information from semi-coupled features and generate inter-view features. In one example, a nonlinear transformation block fuses input features with inter-view features and generate enhanced features.

Example 5

In one example, a semi-coupled extraction block according to example 4 extracts semi-coupled features $\{\bar{f}_L, \bar{f}_R\}$ from input stereo features $\{f_L, f_R\}$ that retains view-shared information while suppressing the view-specific information, comprising multi-stage extraction module, semi-coupled depth-wise separable convolution, and a fusion module. In one example, a multi-stage extraction strategy may be involved to progressively extract the view-shared information.

In one example, a semi-coupled depth-wise separable convolution is applied to each stage c to extract semi-coupled features $$\{s_L^c, s_R^c\}.$$

The process can be formulated as:

$$s_L^c = f_L^{c-1} * \Phi_S^c, f_L^c = f_L^{c-1} * \Phi_L^c,$$

$$s_R^c = f_R^{c-1} * \Phi_S^c, f_R^c = f_R^{c-1} * \Phi_R^c,$$

where * is the depth-wise convolution operation, $$\Phi_S^c$$

is the view-shared convolution kernels and $$\{\Phi_L^c, \Phi_R^c\}$$

are view-specific convolution kernels for the left and right views, respectively.

In one example, a fusion module to fuse output semi-coupled features from each stage to generate final semi-coupled features as follows:

$$\bar{f}_L = G_L(s_L^1 \oplus s_L^2 \dots \oplus s_L^s),$$

$$\bar{f}_R = G_R(s_R^1 \oplus s_R^2 \dots \oplus s_R^s),$$

where $\{G_L, G_R\}$ are gather blocks.

Example 6

In one example, a parallax interaction transformer according to example 4 extracts complementary information from semi-coupled features $\{\bar{f}_L, \bar{f}_R\}$ based on stereo features $\{f_L, f_R\}$ and generate inter-view features $$\{f_L^\star, f_R^\star\}.$$

The parallax interaction transformer may comprise an interaction structure that extracts complementary information from $\bar{f}_R$ according to $f_L$ and extracts complementary information from $\bar{f}_L$ according to $f_R$. The parallax interaction transformer may also comprise a parallax transformer that extracts complementary information along the parallax direction. In one example, the parallax transformer extracts complementary information from $\bar{f}_R$ according to $f_L$.

The query vector, key vectors, and value vectors are generated by linear layers as follows:

$$q_L = \text{Linear}_q(f_L),\, k_R = \text{Linear}_k(\bar{f}_R),\, v_R = \text{Linear}_v(\bar{f}_R)$$

The above three vectors are squeezed along the vertical direction as follows:

$$\hat{p}_L = \text{Squeeze}(f_L),\, \tilde{k}_R = \text{Squeeze}(\bar{f}_R),\, \tilde{v}_R = \text{Squeeze}(\bar{f}_R)$$

where $\text{Squeeze}(\cdot)\colon \mathbb{R}^{B \times C \times H \times W} \to \mathbb{R}^{(B \times H) \times C \times W}$ is the squeeze operation.

The scaled dot-product attention is further performed along the parallax direction, that is, the horizontal direction, followed by the feed-forward network to produce inter-view features $$f_L^{\star},$$

i.e., $$o_L = v_L \times \text{Softmax}\!\left(\frac{q_R \times k_R}{\sqrt{d_k}}\right),$$

$$f_L^{\star} = o_L + FFN(q_L + o_L),$$

in which $\text{Softmax}(\cdot)$ denotes the softmax operation, $d_k$ denotes the scale factor and $FFN(\cdot)$ denotes the feed-forward network.

In an example, the parallax transformer extracts complementary information from $\tilde{f}_L$ according to $f_R$ and generate inter-view features $$f_R^{\star}.$$

The process is similar with that of $$f_L^{\star}.$$

Example 7

In one example, a nonlinear transformation block according to claim 4 that fuses input features $\{f_L,\, f_R\}$ with inter-view features $$\{f_L^{\star},\, f_R^{\star}\},$$

yielding enhanced features $\{\tilde{f}_L,\, \tilde{f}_R\}$. This process can be formulated as follows:

$$\tilde{f}_L = f_L + H_L(f_L \oplus f_L^{\star}),$$

$$\tilde{f}_R = f_R + H_R(f_R \oplus f_R^{\star}),$$

where $\{H_L,\, H_R\}$ denotes the nonlinear transformations implemented by neural network.

Example 8

In one example, a joint conditional entropy model according to example 3 jointly estimates probability distributions of stereo views, including a probability dependency for auxiliary representations and corresponding entropy model; and/or a probability dependency for stereo images and corresponding entropy model.

Example 9

In one example, a probability dependency for auxiliary representations and corresponding entropy model according to example 8 may estimate probability distributions of left-view auxiliary representations $$z_L^s$$

based on prediction features $$g_L^{s+1}$$

which contain intra- and inter-view information. The probability dependency for auxiliary representations and corresponding entropy model may also encode and decode left-view auxiliary representations $$z_L^s$$

based on estimated probability distributions of left-view auxiliary representations $$p(z_L^s \mid g_L^{s+1}).$$

The probability dependency for auxiliary representations and corresponding entropy model may also use the decoded left-view auxiliary representations $$z_L^s$$

to provide supplementary information to model the probability distribution of right-view auxiliary representations $$z_R^s.$$

The probability dependency for auxiliary representations and corresponding entropy model may also encode and decode right-view auxiliary representations $$z_R^s$$

based on estimated probability distributions of right-view auxiliary representations $$p\left(z_R^s \mid z_L^s, g_R^{s+1}\right).$$

Example 10

In one example, a probability dependency for stereo images and corresponding entropy model according to example 8 may construct interlace dependencies between stereo images $\{x_L, x_R\}$, for example by performing any of the following:

Dividing $\{x_L, x_R\}$ along channels into sub-images $\{x_{L,1}, x_{L,2}, x_{L,3}\}$ and $\{x_{R,1}, x_{R,2}, x_{R,3}\}$.

Estimating probability distributions of sub-images $\{x_{L,1}, x_{R,1}\}$ then compressing them by: estimating probability distributions of the sub-image $x_{L,1}$ based on prediction features $$g_L^1$$

which contain intra- and inter-view information; encoding and decoding $x_{L,1}$ based on estimated probability distributions of left-view auxiliary representations $$p\left(x_{L,1} \mid g_L^1\right);$$

using the decoded $x_{L,1}$ to provide supplementary information to model the probability distribution of sub-image $x_{R,1}$; and/or encoding and decoding the sub-image $x_{R,1}$ based on estimated probability distributions $$p\left(x_{R,1} \mid x_{L,1}, g_R^1\right).$$

Estimating probability distributions of sub-images $\{x_{L,2}, x_{R,2}\}$ conditioned on decoded $\{x_{L,1}, x_{R,1}\}$, then compressing them according to: estimating probability distributions of the sub-image $x_{L,2}$ based on prediction features $$g_L^1$$

and $\{x_{L,1}, x_{R,1}\}$; encoding and decoding $x_{L,2}$ based on estimated probability distributions of left-view auxiliary representations $$p\left(x_{L,2} \mid g_L^1, x_{L,1}, x_{R,1}\right);$$

using the decoded $x_{L,2}$ to provide supplementary information to model the probability distribution of sub-image $x_{R,2}$; and/or encoding and decode the sub-image $x_{R,2}$ based on estimated probability distributions $$p\left(x_{R,2} \mid x_{L,2}, g_R^1, x_{L,1}, x_{R,1}\right).$$

Estimating probability distributions of sub-images $\{x_{L,3}, x_{R,3}\}$ conditioned on decoded $\{x_{L,1}, x_{R,1}, x_{L,2}, x_{R,2}\}$ then compressing them according to: estimating probability distributions of the sub-image $x_{L,3}$ based on prediction features $$g_L^1$$

and $\{x_{L,1}, x_{R,1}, x_{L,2}, x_{R,2}\}$; encoding and decoding $x_{L,3}$ based on estimated probability distributions of left-view auxiliary representations $$p\left(x_{L,3} \mid g_L^1, x_{L,1}, x_{R,1}, x_{L,2}, x_{R,2}\right);$$

using the decoded $x_{L,3}$ to provide supplementary information to model the probability distribution of sub-image $x_{R,3}$; and/or encoding and decoding the sub-image $x_{R,3}$ based on estimated probability distributions $$p\left(x_{R,3} \mid x_{L,3}, g_R^1, x_{L,1}, x_{R,1}, x_{L,2}, x_{R,2}\right).$$

5. Example Embodiments

In order to make objects, technical solutions and advantages of the present application clearer, detailed description is further made below to the embodiments of the present disclosure.

A first example embodiment is now described. FIG. 1 illustrates an example framework for a first example embodiment. The embodiment of the present disclosure provides an end-to-end lossless compression network for stereo images, as shown in FIG. 1, including the following steps:

Multiple encoders are leveraged to derive multi-scale auxiliary representations $$\{z_L^s, z_R^s\}_{s=1}^S$$

from $\{x_L, x_R\}$ as follows:

$$z_L^s = \begin{cases} E_L^s(x_L), & s = 1, \\ E_L^s\left(z_L^{s-1}\right), & s = 2,3,\dots,S \end{cases}$$

$$z_R^s = \begin{cases} E_R^s(x_R), & s = 1, \\ E_R^s\left(z_R^{s-1}\right), & s = 2,3,\dots,S \end{cases}$$

where $$\{E_L^s(\cdot), E_R^s(\cdot)\}$$

denote encoders at scale s.

Hierarchical dependencies are established between $\{x_L, x_R\}$ and $$\{z_L^s, z_R^s\}_{s=1}^S$$

as follows:

$$p(x_L, x_R \mid z_L^1, z_R^1, \dots, z_L^S, z_R^S) =$$

$$p(x_L \mid z_L^1, z_R^1, \dots, z_L^S, z_R^S) \cdot p(x_R \mid x_L, z_L^1, z_R^1, \dots, z_L^S, z_R^S),$$

where, $$p(x_L \mid z_L^1, z_R^1, \dots, z_L^S, z_R^S) = p(x_L \mid z_L^1, z_R^1) \cdot \prod_{s=1}^S p(z_L^s \mid z_L^{s+1}, z_R^{s+1}) \cdot p(z_L^S), \text{ and}$$

$$p(x_R \mid x_L, z_L^1, z_R^1, \dots, z_L^S, z_R^S) =$$

$$p(x_R \mid x_L, z_L^1, z_R^1) \cdot \prod_{s=1}^S p(z_R^s \mid z_L^s, z_L^{s+1}, z_R^{s+1}) \cdot p(z_R^S).$$

Multiple predictors are leverage to estimate factorized distributions in Embodiment #1.

Figure 2:
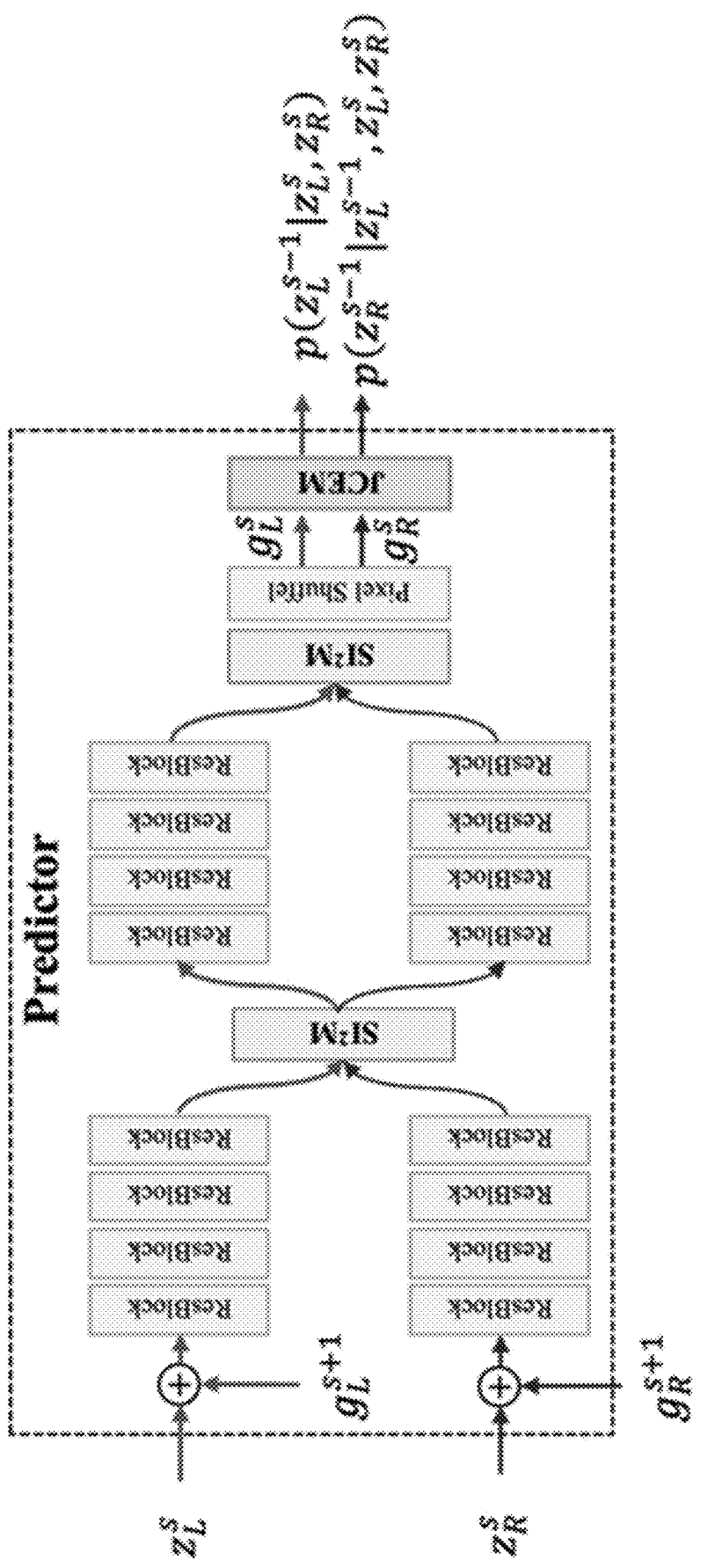
FIG. 2 illustrates an example framework for a second example embodiment.

A second example embodiment is now described. FIG. 2 illustrates an example framework for a second example embodiment. The embodiment of the present disclosure provides a predictor that estimate distributions $$p(z_L^{s-1}, zRs-1 \mid z_L^s, z_R^s),$$

as shown in FIG. 2, including the following steps:

Neural networks are used to provide prediction features $$\{g_L^s, g_R^s\},$$

in which the semi-coupled inter-view interaction module (SI$^2$M) is introduced to extract inter-view information. This process can be formulated as follows:

$$g_L^s, g_R^s = P(z_L^s, z_R^s, g_L^{s+1}, g_R^{s+1}),$$

in which P($\cdot$) indicates the predictor.

The jointly conditional entropy model (JCEM) is used to estimate distributions $$p(z_L^{s-1}, z_R^{s-1} \mid z_L^s, z_R^s).$$

Figure 3:
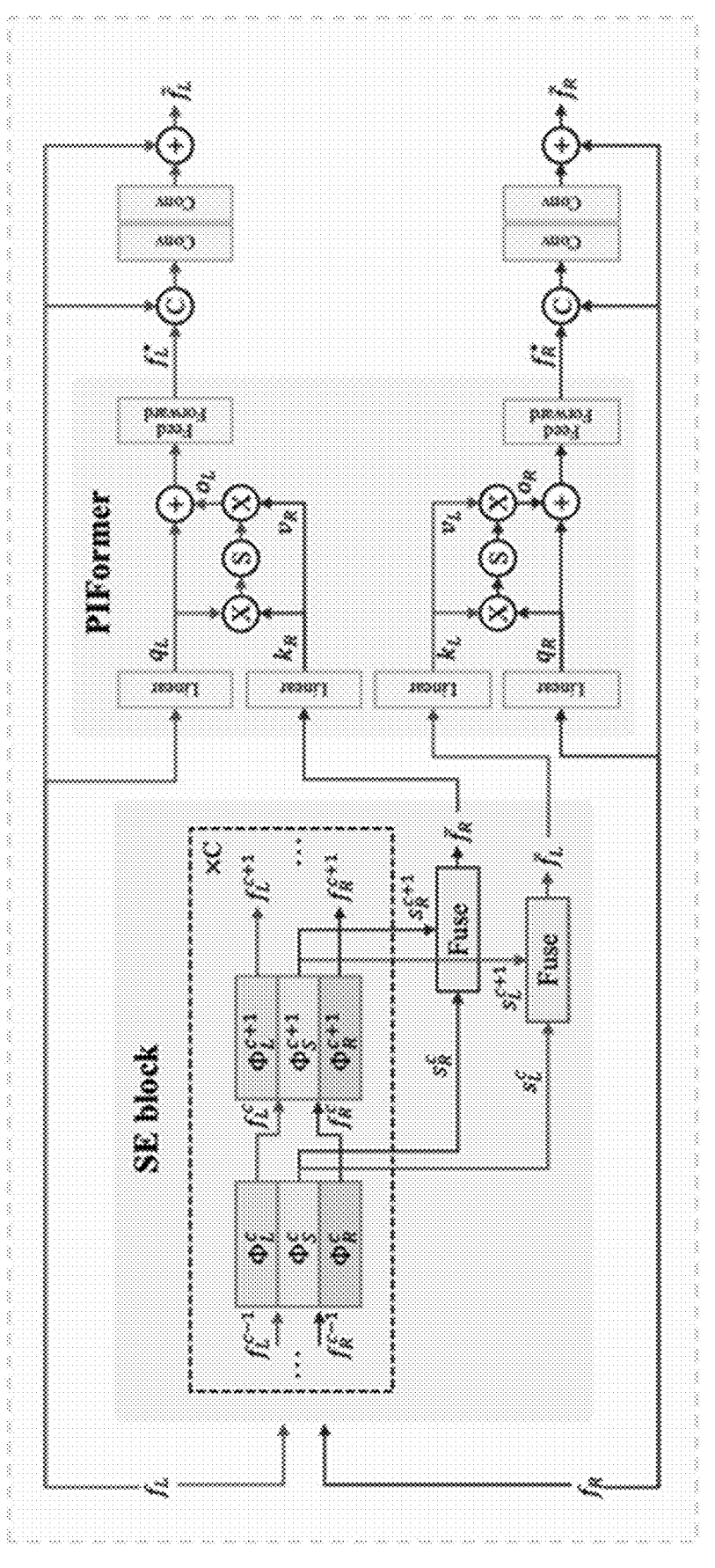
FIG. 3 illustrates an example framework for a third example embodiment.

A third example embodiment is now described. FIG. 3 illustrates an example framework for a third example embodiment.

The embodiment of the present disclosure provides a semi-coupled inter-view interaction module to yield enhanced features that contains both intra-view and inter-view information as effective priors, as shown in FIG. 3, including the following steps:

A semi-coupled extraction (SE) is leveraged block to extract semi-coupled features $\{\bar{f}_L, \bar{f}_R\}$ from input stereo features $\{f_L, f_R\}$ that retain view-shared information while suppressing the view-specific information, including the following steps: Conducting progressively extraction that contains C stages. Leveraging a semi-coupled depth-wise separable convolution applied to each stage c to extract semi-coupled features $$\{s_L^c, s_R^c\}$$

The process can be formulated as:

$$s_L^c = f_L^{c-1} * \Phi_S^c, \ f_L^c = f_L^{c-1} * \Phi_L^c,$$

$$s_R^c = f_R^{c-1} * \Phi_S^c, \ f_R^c = f_R^{c-1} * \Phi_R^c,$$

where * is the depth-wise convolution operation, $$\Phi_S^c$$

is the view-shared convolution kernels and $$\{\Phi_L^c, \Phi_R^c\}$$

are view-specific convolution kernels for the left and right views, respectively. Leveraging a fusion module to fuse output semi-coupled features from each stage to generate final semi-coupled features as follows:

$$\bar{f}_L = G_L(s_L^1 \oplus s_L^2 \ \dots \ \oplus s_L^s),$$

$$\bar{f}_R = G_R(s_R^1 \oplus s_R^2 \ \dots \ \oplus s_R^s),$$

where $\{G_L, G_R\}$ are gather blocks implemented by stacked 1×1 convolution layers.

A parallax interaction transformer is leveraged to extract complementary information from semi-coupled features $\{\bar{f}_L, \bar{f}_R\}$ based on stereo features $\{f_L, f_R\}$ and generate inter-view features $$\{f_L^\star, f_R^\star\},$$

including the following steps: Conducting an interaction structure that extracts complementary information from $\bar{f}_R$ according to $f_L$ and extracts complementary information from $\bar{f}_L$ according to $f_R$. Leveraging a parallax transformer that extracts complementary information along the parallax direction. In one example, the parallax transformer extracts complementary information from $\bar{f}_R$ according to $f_L$. The query vector, key vectors and value vectors are generated by linear layers as follows:

$$q_L = \text{Linear}_q(f_L), \ k_R = \text{Linear}_k(\bar{f}_R), \ v_R = \text{Linear}_v(\bar{f}_R)$$

The above three vectors are squeezed along the vertical direction as follows:

$$\hat{p}_L = \text{Squeeze}(f_L), \, \tilde{k}_R = \text{Squeeze}(\bar{f}_R), \, \tilde{v}_R = \text{Squeeze}(\bar{f}_R)$$

where $\text{Squeeze}(\cdot)$: $\mathbb{R}^{B \times C \times H \times W} \rightarrow \mathbb{R}^{(B \times H) \times C \times W}$ is the squeeze operation. The scaled dot-product attention is further performed along the parallax direction, that is, the horizontal direction, followed by the feed-forward network to produce inter-view features $$f_L^{\star},$$

i.e., $$o_L = v_L \times \text{Softmax}\left(\frac{q_R \times k_R}{\sqrt{d_k}}\right),$$

$$f_L^{\star} = o_L + FFN(q_L + o_L),$$

in which $\text{Softmax}(\cdot)$ denotes the softmax operation, $d_k$ denotes the scale factor and $FFN(\cdot)$ denotes the feed-forward network. In an example, the parallax transformer extracts complementary information from $\bar{f}_L$ according to $f_R$ and generate inter-view features $$f_R^{\star}.$$

The process is similar with that of $$f_L^{\star}.$$

A nonlinear transformation block is leveraged according to example 4 that fuses input features $\{f_L, f_R\}$ with inter-view features $$\{f_L^{\star}, f_R^{\star}\},$$

yielding enhanced features $\{\tilde{f}_L, f_R\}$. This process can be formulated as follows:

$$\tilde{f}_L = f_L + H_L(f_L \oplus f_L^{\star}),$$

$$\tilde{f}_R = f_R + H_R(f_R \oplus f_R^{\star}),$$

where $\{H_L, H_R\}$ denotes the nonlinear transformations implemented by stacked 1×1 convolution layers.

Figure 4:
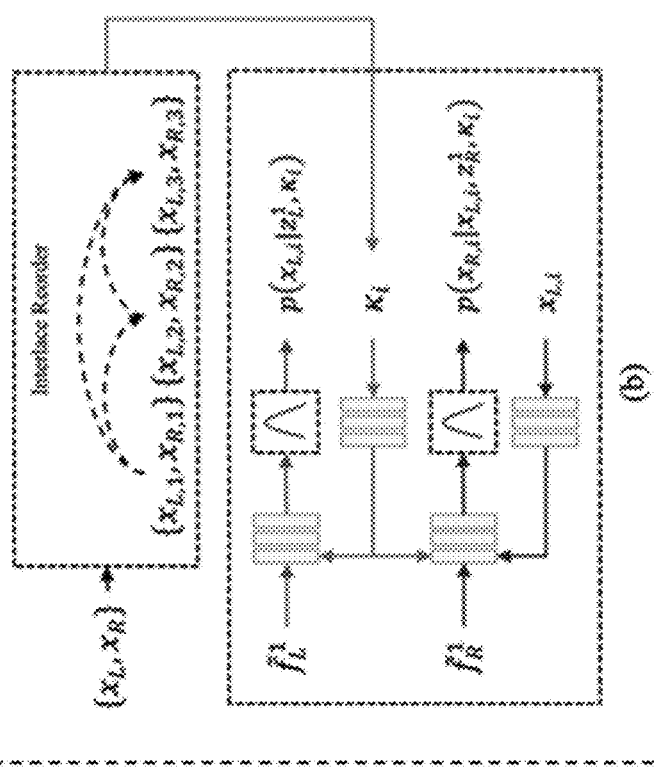
FIG. 4 illustrates an example architecture of a jointly conditional entropy model.
Figure 4:
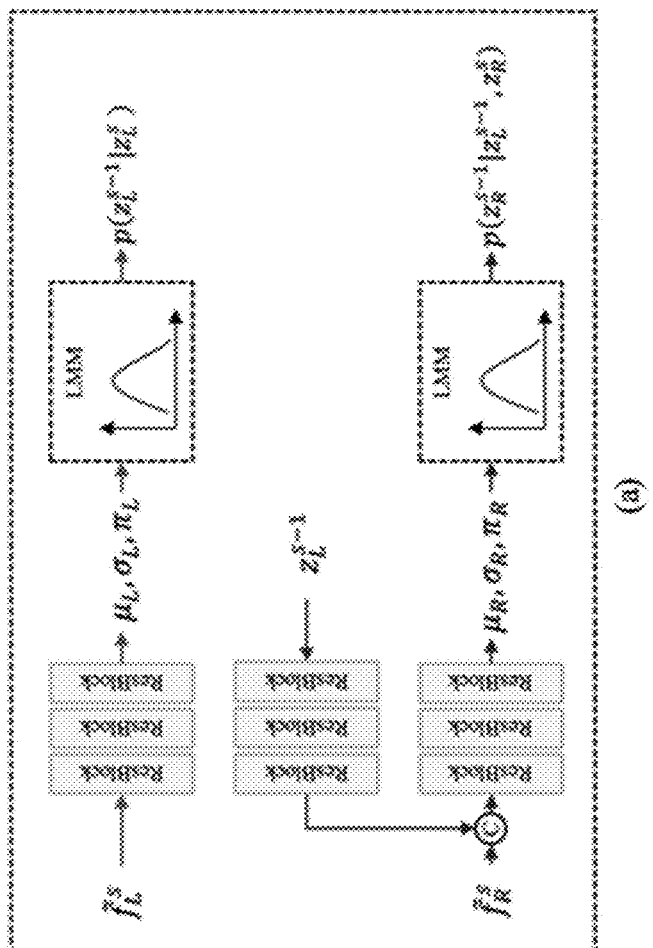

A fourth example embodiment is now described. FIG. 4 illustrates an example architecture of a jointly conditional entrophy model.

The embodiment of the present disclosure provides a joint conditional entropy model to jointly estimates probability distributions of stereo views, as shown in FIG. 4, including the following steps:

Constructing a probability dependency for auxiliary representations $$\{z_L^s, z_R^s\},$$

including the following steps: Estimating probability distributions of left-view auxiliary representations $$z_L^s$$

based on prediction features $$g_L^{s+1}$$

which contain intra- and inter-view information, including the following steps: Parametrically modeling the distributions $$p(z_L^s \mid g_L^{s+1})$$

using the logistic mixture model as follows:

$$p(z_L^s \mid g_L^{s+1}) \sim \mathcal{L}(\mu_L^s, \sigma_L^s, \pi_L^s),$$

where $$\{\mu_L^s, \sigma_L^s, \pi_L^s\}$$

are parameters corresponding to the logistic mixture model. Using neural networks to estimate $$\{\mu_L^s, \sigma_L^s, \pi_L^s\}$$

as follows:

$$\{\mu_L^s, \sigma_L^s, \pi_L^s\} = H_L(g_L^{s+1}),$$

where $H_L(\cdot)$ denotes the estimator implemented by stacked 3×3 convolution layers. Generating estimated distributions $$p(z_L^s \mid g_L^{s+1}).$$

Encoding and decoding left-view auxiliary representations $$z_L^s$$

based on estimated probability distributions of left-view auxiliary representations $$p(z_L^s | g_L^{s+1}).$$

Leveraging the decoded left-view auxiliary representations $$z_L^s$$

to provide supplementary information to model the probability distribution of right-view auxiliary representations $$z_R^s.$$

Parametrically modeling the distributions $$p(z_R^s | z_L^s, g_R^{s+1})$$

using the logistic mixture model as follows:

$$p(z_R^s | z_L^s, g_R^{s+1}) \sim \mathcal{L}(\mu_R^s, \sigma_R^s, \pi_R^s),$$

where $$\{\mu_L^s, \sigma_L^s, \pi_L^s\}$$

are parameters corresponding to the logistic mixture model. Using neural networks to estimate $$\{\mu_R^s, \sigma_R^s, \pi_R^s\}$$

as follows:

$$\{\mu_R^s, \sigma_R^s, \pi_R^s\} = H_R(g_R^{s+1} \otimes z_L^s),$$

where $H_R(\cdot)$ denotes the estimator implemented by stacked 3×3 convolution layers and $\oplus$ denotes the channel-wise concatenation. Generating estimated distributions $$p(z_R^s | z_L^s, g_R^{s+1}).$$

Encoding and decoding right-view auxiliary representations $$z_R^s$$

based on estimated probability distributions of right-view auxiliary representations $$p(z_R^s | z_L^s, g_R^{s+1}).$$

Constructing a probability dependency for auxiliary representations $\{x_L, x_R\}$, including the following steps: Constructing interlace dependencies between stereo images $\{x_L, x_R\}$, including the following steps: Dividing $\{x_L, x_R\}$ along channels into sub-images $\{x_{L,1}, x_{L,2}, x_{L,3}\}$ and $\{x_{R,1}, x_{R,2}, x_{R,3}\}$. Estimating probability distributions of sub-images $\{x_{L,1}, x_{R,1}\}$ then compress them, comprising: Estimating probability distributions of the sub-image $x_{L,1}$ based on prediction features $$g_L^1$$

which contain intra- and inter-view information. Encoding and decoding $x_{L,1}$ based on estimated probability distributions of left-view auxiliary representations $$p(x_{L,1} | g_L^1).$$

Leveraging the decoded $x_{L,1}$ to provide supplementary information to model the probability distribution of sub-image $x_{R,1}$. Encoding and decoding the sub-image $x_{R,1}$ based on estimated probability distributions $$p(x_{R,1} | x_{L,1}, g_R^1).$$

Estimating probability distributions of sub-images $\{x_{L,2}, x_{R,2}\}$ conditioned on decoded $\{x_{L,1}, x_{R,1}\}$, then compress them. Estimating probability distributions of the sub-image $x_{L,2}$ based on prediction features $$g_L^1$$

and $\{x_{L,1}, x_{R,1}\}$. Encoding and decoding $x_{L,2}$ based on estimated probability distributions of left-view auxiliary representations $$p(x_{L,2} | g_L^1, x_{L,1}, x_{R,1}).$$

Leveraging the decoded $x_{L,2}$ to provide supplementary information to model the probability distribution of sub-image $x_{R,2}$. Encoding and decoding the sub-image $x_{R,2}$ based on estimated probability distributions $$p(x_{R,2} | x_{L,2}, g_R^1, x_{L,1}, x_{R,1}).$$

Estimating probability distributions of sub-images $\{x_{L,3}, x_{R,3}\}$ conditioned on decoded $\{x_{L,1}, x_{R,1}, x_{L,2}, x_{R,2}\}$ then compress them. Estimating probability distributions of the sub-image $x_{L,3}$ based on prediction features $$g_L^1$$

and $\{x_{L,1}, x_{R,1}, x_{L,2}, x_{R,2}\}$. Encoding and decoding $x_{L,3}$ based on estimated probability distributions of left-view auxiliary representations $$p(x_{L,3}|g_L^1, x_{L,1}, x_{R,1}, x_{L,2}, x_{R,2}).$$

Leveraging the decoded $x_{L,3}$ to provide supplementary information to model the probability distribution of sub-image $x_{R,3}$. Encoding and decoding the sub-image $x_{R,3}$ based on estimated probability distributions $$p(x_{R,3}|x_{L,3}, g_R^1, x_{L,1}, x_{R,1}, x_{L,2}, x_{R,2}).$$

Figure 5:
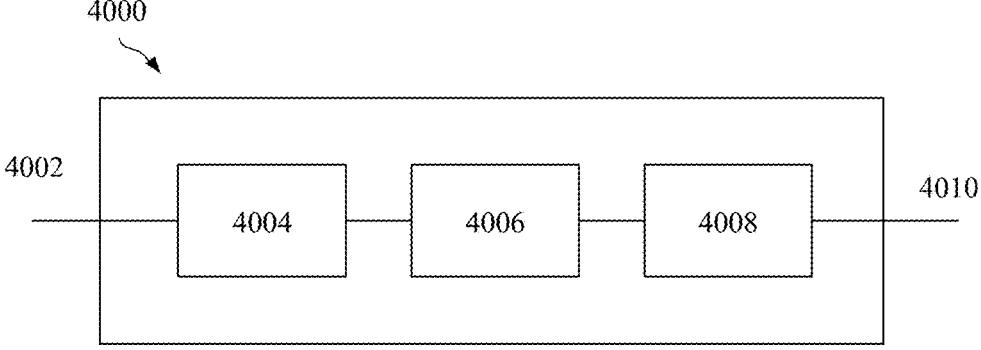
FIG. 5 is a block diagram showing an example video processing system.

FIG. 5 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multicomponent pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 4000 may include a coding component 4004 that may implement the various coding or encoding methods described in the present disclosure. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Figure 6:
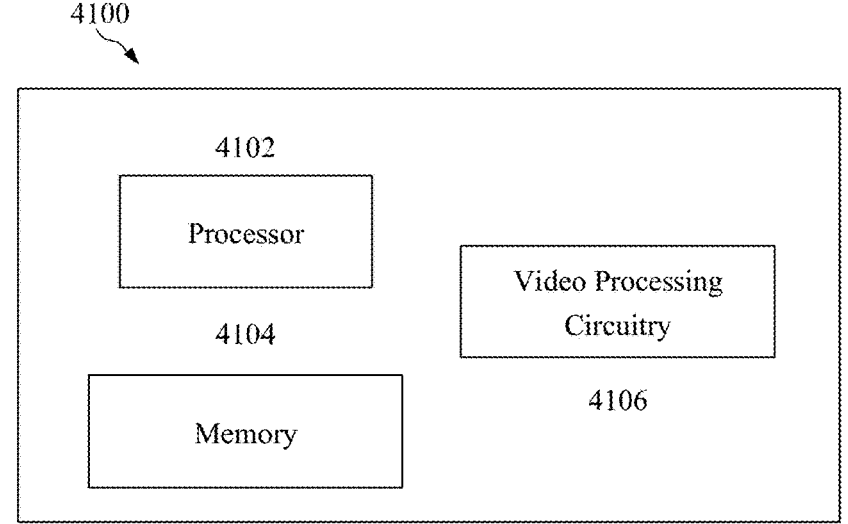
FIG. 6 is a block diagram of an example video processing apparatus.

FIG. 6 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present disclosure. The memory (memories) 4104 may be used for storing data and code used for implementing the methods and techniques described herein. The video processing circuitry 4106 may be used to implement, in hardware circuitry, some techniques described in the present disclosure. In some embodiments, the video processing circuitry 4106 may be at least partly included in the processor 4102, e.g., a graphics co-processor.

Figure 7:
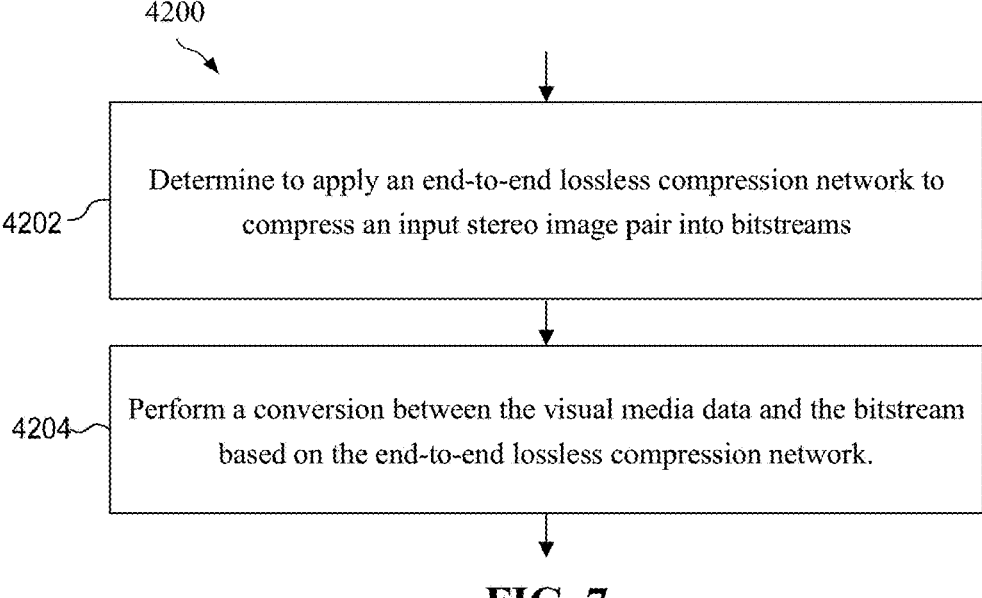
FIG. 7 is a flowchart for an example method of video processing.

FIG. 7 is a flowchart for an example method 4200 of video processing. The method 4200 includes determining to apply an end-to-end lossless compression network to compress an input stereo image pair $\{x_L, x_R\}$ into bitstreams $\{b_L, b_R\}$ at step 4202. A conversion is performed between a visual media data and a bitstream based on the end-to-end lossless compression network at step 4204. The conversion of step 4204 may include encoding at an encoder or decoding at a decoder, depending on the example.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 8:
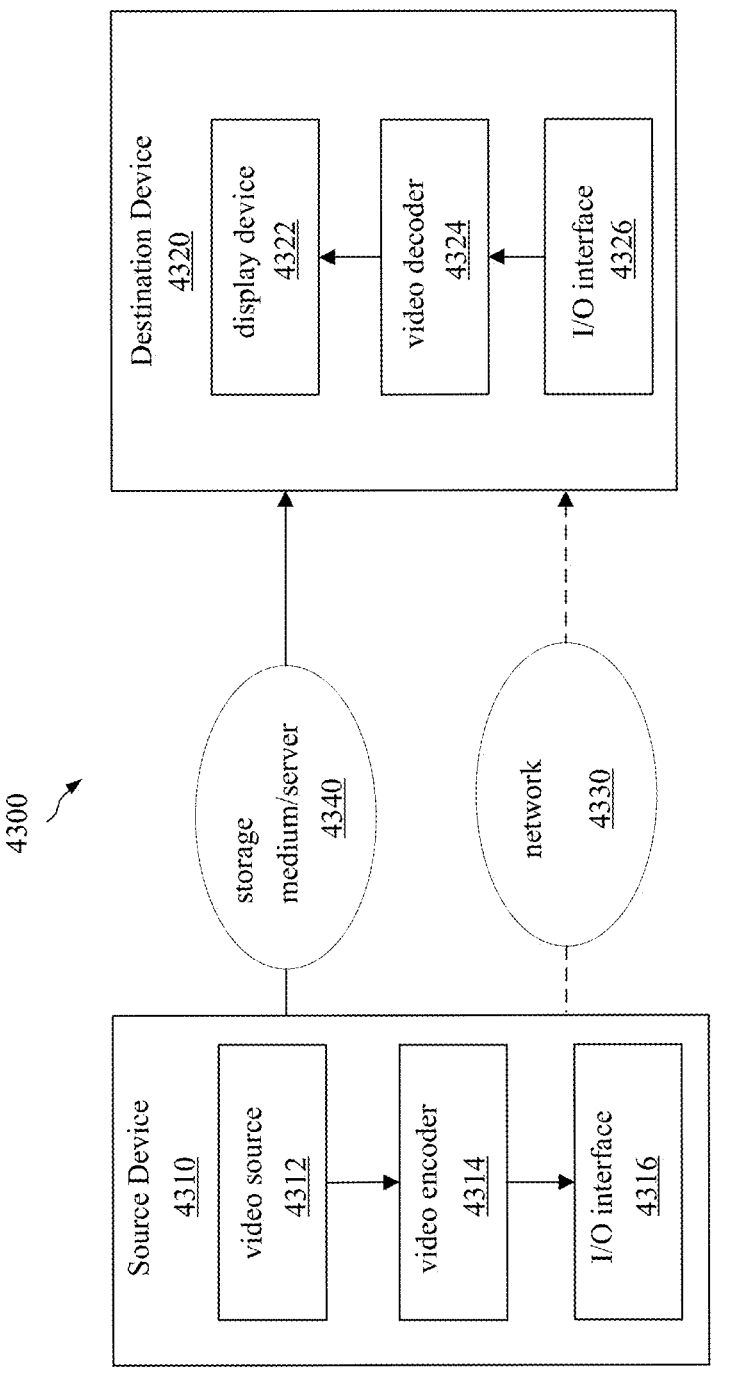
FIG. 8 is a block diagram that illustrates an example video coding system.

FIG. 8 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVC) standard and other current and/or further standards.

Figure 9:
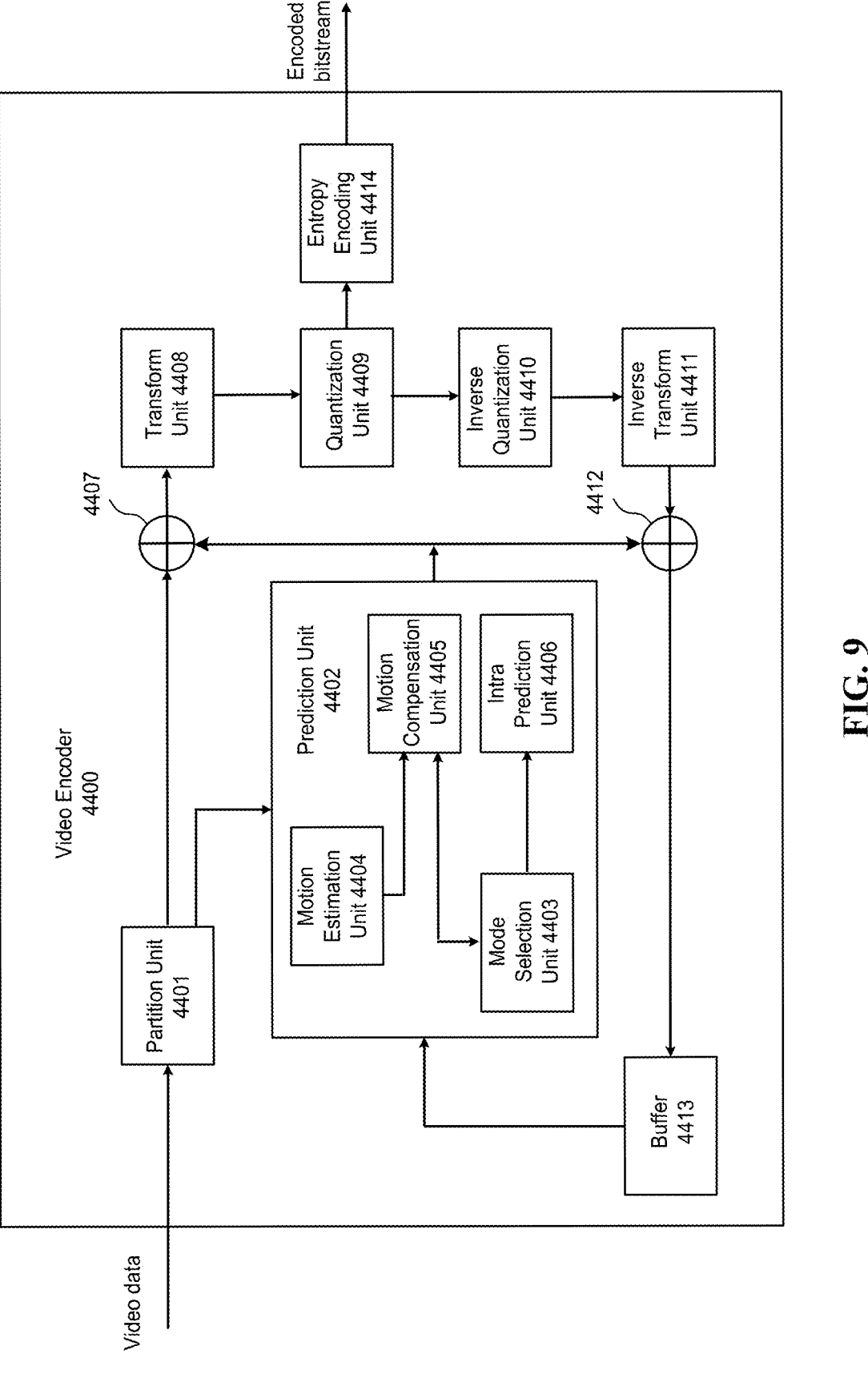
FIG. 9 is a block diagram that illustrates an example encoder.

FIG. 9 is a block diagram illustrating an example of video encoder 4400, which may be video encoder 4314 in the system 4300 illustrated in FIG. 8. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401, a prediction unit 4402 which may include a mode select unit 4403, a motion estimation unit 4404, a motion compensation unit 4405, an intra prediction unit 4406, a residual generation unit 4407, a transform processing unit 4408, a quantization unit 4409, an inverse quantization unit 4410, an inverse transform unit 4411, a reconstruction unit 4412, a buffer 4413, and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block. The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 10:
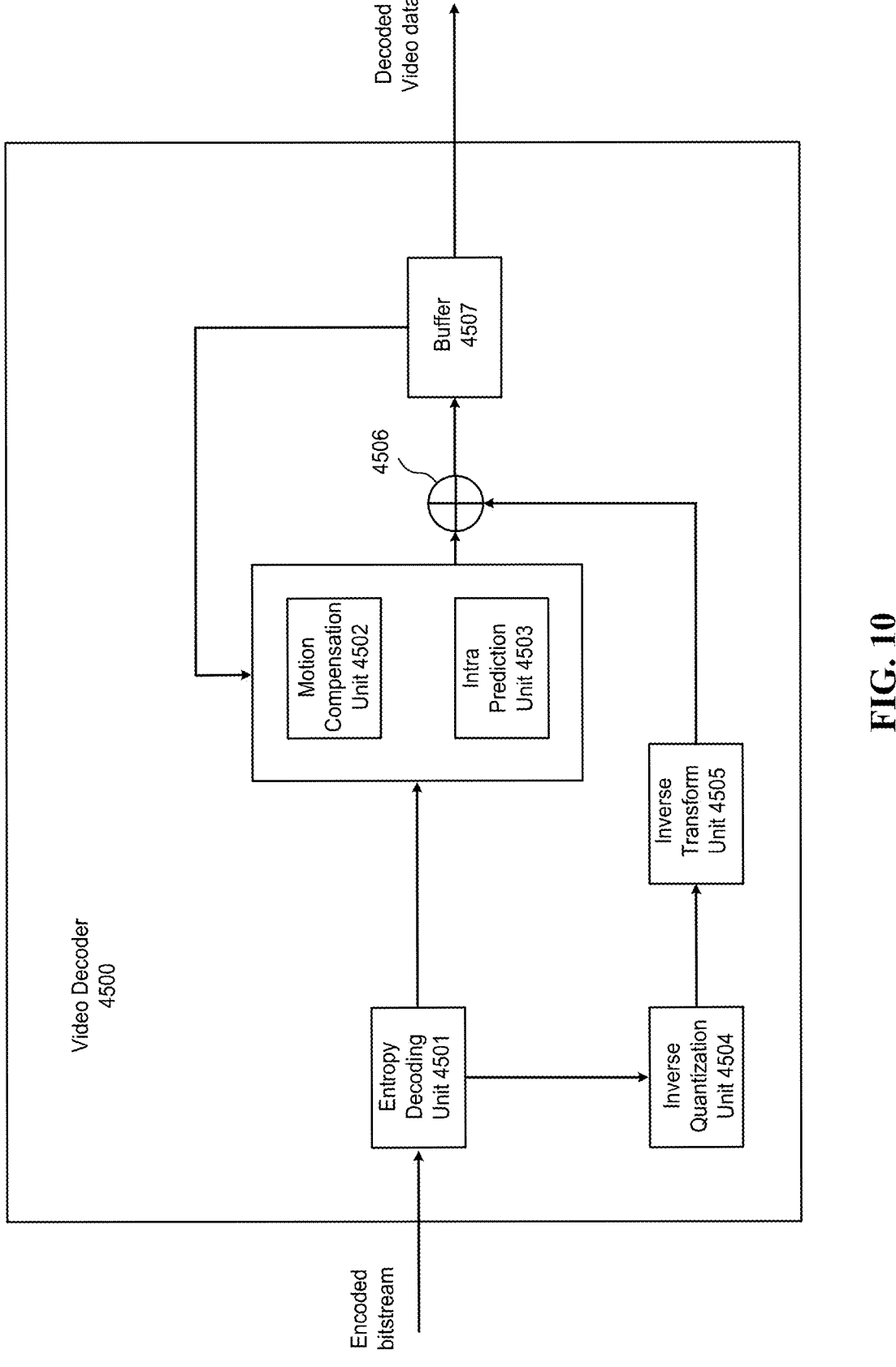
FIG. 10 is a block diagram that illustrates an example decoder.

FIG. 10 is a block diagram illustrating an example of video decoder 4500 which may be video decoder 4324 in the system 4300 illustrated in FIG. 8. The video decoder 4500 may be configured to perform any or all of the techniques of this disclosure. In the example shown, the video decoder 4500 includes a plurality of functional components. The techniques described in this disclosure may be shared among the various components of the video decoder 4500. In some examples, a processor may be configured to perform any or all of the techniques described in this disclosure.

In the example shown, video decoder 4500 includes an entropy decoding unit 4501, a motion compensation unit

4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

Figure 11:
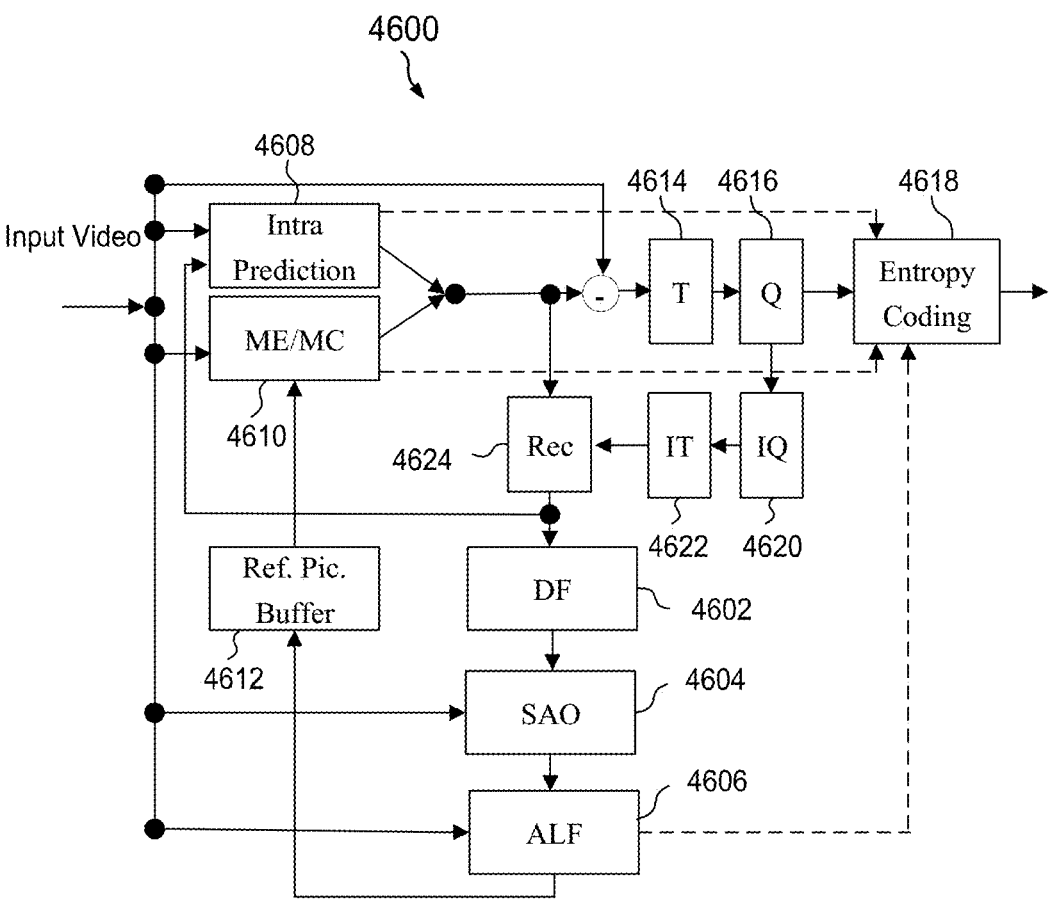
FIG. 11 is a schematic diagram of an example encoder.

FIG. 11 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of techniques discussed herein.

1. A method for processing video data (e.g., method 4200 depicted in FIG. 7) comprising: determining (4202) to apply an end-to-end lossless compression network to compress an input stereo image pair $\{x_L, x_R\}$ into bitstreams $\{b_L, b_R\}$; and performing (4204) a conversion between the visual media data and the bitstreams based on the end-to-end lossless compression network.

2. The method of solution 1, wherein the end-to-end lossless compression network comprises a multi-scale coding structure that derives multi-scale auxiliary representations $$\{z_L^s, z_R^s\}_{s=1}^S$$

from $\{x_L, x_R\}$ and establishes hierarchical dependencies between $\{x_L, x_R\}$ and $$\{z_L^s, z_R^s\}_{s=1}^S$$

as follows:

$$p(x_L, x_R | z_L^1, z_R^1, \ldots, z_L^S, z_R^S) =$$
$$p(x_L | z_L^1, z_R^1, \ldots, z_L^S, z_R^S) \cdot p(x_R | x_L, z_L^1, z_R^1, \ldots, z_L^S, z_R^S), \text{ where,}$$

$$p(x_L | z_L^1, z_R^1, \ldots, z_L^S, z_R^S) = p(x_L | z_L^1, z_R^1) \cdot \prod_{s=1}^S p(z_L^s | z_L^{s+1}, z_R^{s+1}) \cdot p(z_L^S), \text{ and}$$

$$p(x_R | x_L, z_L^1, z_R^1, \ldots, z_L^S, z_R^S) =$$
$$p(x_R | x_L, z_L^1, z_R^1) \cdot \prod_{s=1}^S p(z_R^s | z_L^s, z_L^{s+1}, z_R^{s+1}) \cdot p(z_R^S).$$

3. The method of any of solutions 1-2, wherein the end-to-end lossless compression network comprises an auto-encoder network configured to apply each scale to estimate $$p(z_L^s | z_L^{s+1}, z_R^{s+1}) \text{ and } p(z_R^s | z_L^s, z_L^{s+1}, z_R^{s+1}).$$

4. The method of any of solutions 1-3, wherein the auto-encoder network is configured to estimate probability distributions for $$\{z_L^s, z_R^s\},$$

and wherein the auto-encoder network comprises: an encoder configured to generate non-quantized auxiliary representations $$\{y_L^{s+1}, y_R^{s+1}\}$$

based on previous scale non-quantized auxiliary representations $$\{y_L^s, y_R^s\};$$

a scale quantizer configured to quantize $$\{y_L^{s+1}, y_R^{s+1}\}$$

to quantized auxiliary representations $$\{z_L^{s+1}, z_R^{s+1}\},$$

as compressed by entropy coding according to $$p(z_L^s | z_L^{s+1}, z_R^{s+1}) \text{ and } p(z_R^s | z_L^s, z_L^{s+1}, z_R^{s+1})$$

provided by the auto-encoder network at scale s+2; and a predictor configured to jointly estimate probability distributions $$p(z_L^s | z_L^{s+1}, z_R^{s+1}) \text{ and } p(z_R^s | z_L^s, z_L^{s+1}, z_R^{s+1}).$$

5. The method of any of solutions 1-4, wherein the predictor jointly estimates $$p(z_L^s | z_L^{s+1}, z_R^{s+1}) \text{ and } p(z_R^s | z_L^s, z_L^{s+1}, z_R^{s+1})$$

based on intra-view and inter-view priors.

6. The method of any of solutions 1-5, wherein the predictor includes an inter-view interaction module and an entropy model, wherein the inter-view interaction module is a semi-coupled inter-view interaction module configured to extract view-sharing information as effective inter-view prior information, and wherein the entropy model is a joint conditional entropy model configured to jointly estimate distributions of left and right views with a consideration of intra-view and inter-view prior information.

7. The method of any of solutions 1-6, wherein the inter-view interaction module is configured to extract inter-view prior information from input stereo features $\{f_L, f_R\}$ and yield enhanced stereo features $\{\tilde{f}_L, \tilde{f}_R\}$ by incorporating the inter-view prior information with $\{f_L, f_R\}$.

8. The method of any of solutions 1-7, wherein the inter-view interaction module includes a semi-coupled extraction block configured to extract view-shared information and generate semi-coupled features, a parallax interaction transformer configured to extract complementary information from semi-coupled features and generate inter-view features, a nonlinear transformation block configured to fuse input features with inter-view features and generate enhanced features, or combinations thereof.

9. The method of any of solutions 1-8, wherein the semi-coupled extraction block is configured to extract semi-coupled features $\{\tilde{f}_L, \tilde{f}_R\}$ from input stereo features $\{f_L, f_R\}$ that retain view-shared information while suppressing view-specific information, wherein the semi-coupled extraction block comprises a multi-stage extraction module, a semi-coupled depth-wise separable convolution, and a fusion module.

10. The method of any of solutions 1-9, wherein the semi-coupled extraction block employs a multi-stage extraction strategy to progressively extract the view-shared information, wherein a semi-coupled depth-wise separable convolution is applied to each stage c to extract semi-coupled features $$\{s_L^c, s_R^c\}$$

according to:

$$s_L^c = f_L^{c-1} * \Phi_S^C, f_L^c = f_L^{c-1} * \Phi_L^C, s_R^c = f_R^{c-1} * \Phi_S^c, f_R^c = f_R^{c-1} * \Phi_R^c,$$

where $*$ is the depth-wise convolution operation, $$\Phi_S^c$$

is the view-shared convolution kernels and $$\{\Phi_L^c, \Phi_R^c\}$$

are view-specific convolution kernels for the left and right views.

11. The method of any of solutions 1-10, wherein the semi-coupled extraction block employs a fusion module to fuse output semi-coupled features from each stage to generate final semi-coupled features as follows:

$$\tilde{f}_L = G_L(s_L^1 \oplus s_L^2 \ldots \oplus s_L^S), \tilde{f}_R = G_R(s_R^1 \oplus s_R^2 \ldots \oplus s_R^S),$$

where $\{G_L, G_R\}$ are gather blocks.

12. The method of any of solutions 1-11, wherein the parallax interaction transformer is configured to extract complementary information from semi-coupled features $\{\tilde{f}_L, \tilde{f}_R\}$ based on stereo features $\{f_L, f_R\}$ and generate inter-view features $$\{f_L^*, f_R^*\},$$

wherein the parallax interaction transformer comprises an interaction structure that extracts complementary information from $\tilde{f}_R$ according to $f_L$ and extracts complementary information from $\tilde{f}_L$ according to $f_R$, wherein the parallax interaction transformer comprises a parallax transformer configured to extract complementary information along the parallax direction, wherein the parallax transformer extracts complementary information from $\tilde{f}_R$ according to $f_L$, wherein query vector, key vectors, and value vectors are generated by linear layers as follows: $q_L = \mathrm{Linear}_q(\tilde{f}_L)$, $k_R = \mathrm{Linear}_k(\tilde{f}_R)$, $V_R = \mathrm{Linear}_v(\tilde{f}_R)$, wherein the query vector, key vectors, and value vectors are squeezed along a vertical direction as follows: $\bar{P}_L = \mathrm{Squeeze}(f_L)$, $\bar{k}_R = \mathrm{Squeeze}(\tilde{f}_R)$, $\bar{V}_R = \mathrm{Squeeze}(\tilde{f}_R)$, where $\mathrm{Squeeze}(\cdot)$: $\mathbb{R}^{B \times C \times H \times W} \to \mathbb{R}^{(B \times H) \times C \times W}$ is the squeeze operation, wherein a scaled dot-product attention is performed along a parallax direction followed by a feed-forward network to produce inter-view features $$f_L^*$$

according to:

$$o_L = v_L \times \mathrm{Softmax}\left(\frac{q_R \times k_R}{\sqrt{d_k}}\right),$$

$$f_L^* = o_L + FFN(q_L + o_L),$$

in which $\mathrm{Softmax}(\cdot)$ denotes a softmax operation, $d_k$ denotes a scale factor and $FFN(\cdot)$ denotes the feed-forward network, and wherein the parallax transformer is configured to extract complementary information from $\tilde{f}_L$ according to $f_R$ and generate inter-view features $$f_R^*.$$

13. The method of any of solutions 1-12, wherein the nonlinear transformation block is configured to fuse input features $\{f_L, f_R\}$ with inter-view features $$\{f_L^*, f_R^*\},$$

yielding enhanced features $\{\tilde{f}_L, \tilde{f}_R\}$ according to:

$$\tilde{f}_L = f_L + H_L(f_L \oplus f_L^*), \tilde{f}_R = f_R + H_R(f_R \oplus f_R^*),$$

where $\{H_L, H_R\}$ denotes the nonlinear transformations implemented by neural network.

14. The method of any of solutions 1-13, wherein the joint conditional entropy model is configured to jointly estimate probability distributions of stereo views including a probability dependency for auxiliary representations and corresponding entropy model and a probability dependency for stereo images and corresponding entropy model.

15. The method of any of solutions 1-14, wherein the probability dependency for auxiliary representations and corresponding entropy model are configured to: estimate probability distributions of left-view auxiliary representations $$z_L^s$$

based on prediction features $$g_L^{s+1}$$

which contain intra- and inter-view information; encode and decode left-view auxiliary representations $$z_L^s$$

based on estimated probability distributions of left-view auxiliary representations $$p(z_L^s \mid g_L^{s+1});$$

use the decoded left-view auxiliary representations $$z_L^s$$

provide supplementary information to model the probability distribution of right-view auxiliary representations $$z_R^s;$$

and encode and decode right-view auxiliary representations $$z_R^s$$

based on estimated probability distributions of right-view auxiliary representations $$p(z_R^s \mid z_L^s, g_R^{s+1}).$$

16. The method of any of solutions 1-15, wherein the probability dependency for stereo images and corresponding entropy model are configured to construct interlace dependencies between stereo images $\{x_L, x_R\}$ by: dividing $\{x_L, x_R\}$ along channels into sub-images $\{x_{L,1}, x_{L,2}, x_{L,3}\}$ and $\{x_{R,1}, x_{R,2}, x_{R,3}\}$; estimating probability distributions of sub-images $\{x_{L,1}, x_{R,1}\}$ then compressing them by: estimating probability distributions of the sub-image $x_{L,1}$ based on prediction features $$g_L^1$$

which contain intra-view and inter-view information; encoding and decoding $x_{L,1}$ based on estimated probability distributions of left-view auxiliary representations $$p(x_{L,1} \mid g_L^1);$$

using the decoded $x_{L,1}$ to provide supplementary information to model the probability distribution of sub-image $x_{R,1}$; and encoding and decoding the sub-image $x_{R,1}$ based on estimated probability distributions $$p(x_{R,1} \mid x_{L,1}, g_R^1);$$

estimating probability distributions of sub-images $\{x_{L,2}, x_{R,2}\}$ conditioned on decoded $\{x_{L,1}, x_{R,1}\}$ then compressing them according to: estimating probability distributions of the sub-image $x_{L,2}$ based on prediction features $$g_L^1$$

encoding and decoding $x_{L,2}$ based on estimated probability distributions of left-view auxiliary representations $$p(x_{L,2} \mid g_L^1, x_{L,1}, x_{R,1});$$

using the decoded $x_{L,2}$ to provide supplementary information to model the probability distribution of sub-image $x_{R,2}$; and encoding and decode the sub-image $x_{R,2}$ based on estimated probability distributions $$p(x_{R,2} \mid x_{L,2}, g_R^1, x_{L,1}, x_{R,1});$$

and estimating probability distributions of sub-images $\{x_{L,3}, x_{R,3}\}$ conditioned on decoded $\{x_{L,1}, x_{R,1}, x_{L,2}, x_{R,2}\}$ then compressing them according to: estimating probability distributions of the sub-image $x_{L,3}$ based on prediction features $$g_L^1$$

and $\{x_{L,1}, x_{R,1}, x_{L,2}, x_{R,2}\}$; encoding and decoding $x_{L,3}$ based on estimated probability distributions of left-view auxiliary representations $$p(x_{L,3} \mid g_L^1, x_{L,1}, x_{R,1}, x_{L,2}, x_{R,2});$$

using the decoded $x_{L,3}$ to provide supplementary information to model the probability distribution of sub-image $x_{R,3}$; and encoding and decoding the sub-image $x_{R,3}$ based on estimated probability distributions $$p(x_{R,3} \mid x_{L,3}, g_R^1, x_{L,1}, x_{R,1}, x_{L,2}, x_{R,2}).$$

17. An apparatus for processing video data comprising: a processor; and a non-transitory memory with instructions thereon, wherein the instructions upon execution by the processor, cause the processor to perform the method of any of solutions 1-16.

18. A non-transitory computer readable medium comprising a computer program product for use by a video coding device, the computer program product comprising computer executable instructions stored on the non-transitory computer readable medium such that when executed by a processor cause the video coding device to perform the method of any of solutions 1-16.

19. A non-transitory computer-readable recording medium storing a bitstream of a video which is generated by a method performed by a video processing apparatus, wherein the method comprises: determining to apply an end-to-end lossless compression network to compress an input stereo image pair $\{x_L, x_R\}$ into bitstreams $\{b_L, b_R\}$; and generating the bitstream based on the determining.

20. A method for storing bitstream of a video comprising: determining to apply an end-to-end lossless compression network to compress an input stereo image pair $\{x_L, x_R\}$ into bitstreams $\{b_L, b_R\}$; generating the bitstream based on the determining; and storing the bitstream in a non-transitory computer-readable recording medium.

21. A method, apparatus, or system described in the present disclosure.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including+10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data, comprising:

determining, for a conversion between visual media data of a video and bitstreams of the video, that an end-to-end lossless compression network for stereo images is applied to compress an input stereo image pair $\{x_L, x_R\}$ into the bitstreams $\{b_L, b_R\}$, where x represents an input stereo image, b represents one of the bitstreams, L represents left, and R represents right; and performing the conversion based on the end-to-end lossless compression network, wherein a multi-scale coding structure that derives multi-scale auxiliary representations $$\{z_L^s, z_R^s\}_{s=1}^S$$

from $\{x_L, x_R\}$ and establishes hierarchical dependencies between $\{x_l, x_R\}$ and $$\{z_L^s, z_R^s\}_{s=1}^S$$

is applied, where S is a positive integer and represents scale, and, wherein an auto-encoder network is applied to each scale to estimate $$p(z_L^s \mid z_L^{s+1}, z_R^{s+1}) \text{ and}$$
$$p(z_R^s \mid z_L^s, z_L^{s+1}, z_R^{s+1}),$$

where p represents a probability distribution.

2. The method of claim 1, wherein the auto-encoder network is configured to estimate probability distributions for $$\{z_L^s, z_R^s\}.$$

3. The method of claim 2, wherein the auto-encoder network includes a predictor that is configured to jointly estimate probability distribution $$p(z_L^s \mid z_L^{s+1}, z_R^{s+1}) \text{ and}$$
$$p(z_R^s \mid z_L^s, z_L^{s+1}, z_R^{s+1})$$

based on intra-view and inter-view priors.

4. The method of claim 3, wherein the predictor includes an inter-view interaction module and an entropy model.

5. The method of claim 4, wherein the inter-view interaction module includes a semi-coupled inter-view interaction module that is configured to extract view-sharing information as effective inter-view prior information.

6. The method of claim 5, wherein the semi-coupled inter-view interaction module is further configured to extract the inter-view prior information from input stereo features and yield enhanced stereo features $\{\bar{f}_L, \bar{f}_R\}$ by incorporating the inter-view prior information with $\{f_L, f_R\}$.

7. The method of claim 5, wherein the semi-coupled inter-view interaction module includes a semi-coupled extraction block that is configured to extract view-shared information and generate semi-coupled features.

8. The method of claim 7, wherein the semi-coupled extraction block is further configured to extract the semi-coupled features $\{\bar{f}_L, \bar{f}_R\}$ from input stereo features $\{f_L, f_R\}$ that retains the view-shared information while suppressing view-specific information.

9. The method of claim 7, wherein the semi-coupled extraction block includes a multi-stage extraction module, a semi-coupled depth-wise separable convolution, and a fusion module.

10. The method of claim 5, wherein the semi-coupled inter-view interaction module includes a parallax interaction transformer that is configured to extract complementary information from semi-coupled features and generate inter-view features.

11. The method of claim 10, wherein the parallax inter-action transformer is further configured to extract the complementary information from the semi-coupled features $\{\bar{f}_L, \bar{f}_R\}$ based on stereo features $\{f_L, f_R\}$ and generate the inter-view features $$\{f_L^*, f_R^*\}.$$

12. The method of claim 5, wherein the semi-coupled inter-view interaction module includes a nonlinear transformation block that is configured to fuse input features with inter-view features and generate enhanced features.

13. The method of claim 12, wherein the nonlinear transformation block is further configured to fuse the input features $\{f_L, f_R\}$ with the inter-view features $$\{f_L^*, f_R^*\},$$

yielding the enhanced features $\{\tilde{f}_L, \tilde{f}_R\}$ according to:

$$\tilde{f}_L = f_L + H_L(f_L \oplus f_L^*),$$
$$\tilde{f}_R = f_R + H_R(f_R \oplus f_R^*),$$

where $\{H_L, H_R\}$ denotes nonlinear transformations implemented by a neural network.

14. The method of claim 4, wherein the entropy model includes a joint conditional entropy model that is configured to jointly estimate distributions of left and right views based on intra-view and inter-view prior information.

15. The method of claim 14, wherein the joint conditional entropy model is further configured to jointly estimate probability distributions of stereo views, wherein the probability distributions of the stereo views include a probability dependency for auxiliary representations and corresponding entropy model, or the probability distributions of the stereo views include a probability dependency for stereo images and corresponding entropy model.

16. The method of claim 1, wherein the conversion includes encoding the visual media data into the bitstreams.

17. The method of claim 1, wherein the conversion includes decoding the visual media data from the bitstreams.

18. An apparatus for processing video data comprising a processor and a non-transitory memory with instructions thereon, wherein the instructions upon execution by the processor, cause the processor to:

determine, for a conversion between visual media data of a video and bitstreams of the video, that an end-to-end lossless compression network for stereo images is applied to compress an input stereo image pair $\{x_L, x_R\}$ into the bitstreams $\{b_L, b_R\}$, where x represents an input stereo image, b represents one of the bitstreams, L represents left, and R represents right; and performing the conversion based on the end-to-end lossless compression network, wherein a multi-scale coding structure that derives multi-scale auxiliary representations $$\{z_L^s, z_R^s\}_{s=1}^S$$

from $\{x_L, x_R\}$ and establishes hierarchical dependencies between $\{x_L, x_R\}$ and $$\{z_L^s, z_R^s\}_{s=1}^S$$

is applied, where S is a positive integer and represents scale, and wherein an auto-encoder network is applied to each scale to estimate $$p(z_L^s \mid z_L^{s+1}, z_R^{s+1}) \text{ and}$$
$$p(z_R^s \mid z_L^s, z_L^{s+1}, z_R^{s+1}),$$

where p represents a probability distribution.

19. A non-transitory computer-readable recording medium storing bitstreams of a video which are generated by a method performed by a video processing apparatus, wherein the method comprises:

determining that an end-to-end lossless compression network for stereo images is applied to compress an input stereo image pair $\{x_L, x_R\}$ into the bitstreams $\{b_L, b_R\}$, where x represents an input stereo image, b represents one of the bitstreams, L represents left, and R represents right; and generating the bitstreams based on the end-to-end lossless compression network, wherein a multi-scale coding structure that derives multi-scale auxiliary representations $$\{z_L^s, z_R^s\}_{s=1}^S$$

from $\{x_L, x_R\}$ and establishes hierarchical dependencies between $\{x_L, x_R\}$ and $$\{z_L^s, z_R^s\}_{s=1}^S$$

is applied, where S is a positive integer and represents scale, and wherein an auto-encoder network is applied to each scale
　　　　to estimate $$p\left(z_L^s \mid z_L^{s+1},\, z_R^{s+1}\right) \text{ and}$$

$$p\left(z_R^s \mid z_L^s,\, z_L^{s+1},\, z_R^{s+1}\right),$$

where p represents a probability distribution.

\* \* \* \* \*